United States Patent
Kaeriyama

(10) Patent No.: US 12,428,573 B2
(45) Date of Patent: Sep. 30, 2025

(54) INK COMPOSITION FOR INKJET RECORDING, INK SET, AND IMAGE RECORDING METHOD

(71) Applicant: FUJIFILM Corporation, Tokyo (JP)

(72) Inventor: Atsushi Kaeriyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1011 days.

(21) Appl. No.: 17/509,396

(22) Filed: Oct. 25, 2021

(65) Prior Publication Data

US 2022/0041880 A1 Feb. 10, 2022

Related U.S. Application Data

(63) Continuation of application No. PCT/JP2020/017987, filed on Apr. 27, 2020.

(30) Foreign Application Priority Data

Apr. 26, 2019 (JP) ................................. 2019-085858

(51) Int. Cl.
| | |
|---|---|
| *C09D 11/40* | (2014.01) |
| *B41M 5/00* | (2006.01) |
| *C09D 11/033* | (2014.01) |
| *C09D 11/037* | (2014.01) |
| *C09D 11/102* | (2014.01) |
| *C09D 11/322* | (2014.01) |
| *C09D 11/54* | (2014.01) |

(52) U.S. Cl.
CPC ........... *C09D 11/40* (2013.01); *B41M 5/0023* (2013.01); *C09D 11/033* (2013.01); *C09D 11/037* (2013.01); *C09D 11/102* (2013.01); *C09D 11/322* (2013.01); *C09D 11/54* (2013.01)

(58) Field of Classification Search
CPC ..... C09D 11/40; C09D 11/033; C09D 11/037; C09D 11/102; C09D 11/322; C09D 11/54; C09D 11/106; C09D 11/107; C09D 11/38; B41M 5/0023; B41M 5/0017

See application file for complete search history.

(56) References Cited

U.S. PATENT DOCUMENTS

| | | | |
|---|---|---|---|
| 2009/0202722 A1 | 8/2009 | Yanagi et al. | |
| 2010/0075052 A1 | 3/2010 | Irita | |
| 2010/0080913 A1 | 4/2010 | Irita | |
| 2011/0249055 A1 | 10/2011 | Sasada et al. | |
| 2012/0076951 A1* | 3/2012 | Tojo ..................... | C08K 5/3437 524/561 |
| 2013/0222502 A1 | 8/2013 | Kobayashi | |
| 2013/0250002 A1 | 9/2013 | Nishimura et al. | |
| 2015/0214554 A1* | 7/2015 | Kaneda ............... | H01M 4/9041 429/484 |
| 2016/0115329 A1* | 4/2016 | Ohmoto ................. | C09D 11/10 347/20 |
| 2016/0222238 A1 | 8/2016 | Arai et al. | |
| 2016/0333209 A1* | 11/2016 | Shimono ............... | B41M 5/0017 |
| 2016/0368285 A1 | 12/2016 | Shinjo et al. | |
| 2018/0030298 A1 | 2/2018 | Yamazaki et al. | |
| 2018/0086112 A1* | 3/2018 | Matsuzaki ........... | C09D 11/108 |
| 2019/0010349 A1 | 1/2019 | Shimono et al. | |
| 2019/0016911 A1 | 1/2019 | Okamoto et al. | |
| 2019/0085193 A1 | 3/2019 | Ushiku | |
| 2019/0283464 A1 | 9/2019 | Matsuzaki | |
| 2019/0284426 A1 | 9/2019 | Matsuzaki et al. | |
| 2019/0284427 A1 | 9/2019 | Matsuzaki et al. | |
| 2020/0010708 A1 | 1/2020 | Sugihara et al. | |
| 2020/0157370 A1* | 5/2020 | Okamoto ............. | C09D 11/326 |
| 2021/0060993 A1 | 3/2021 | Hayamizu et al. | |
| 2021/0214569 A1 | 7/2021 | Yoda et al. | |

FOREIGN PATENT DOCUMENTS

| | | |
|---|---|---|
| CN | 103287142 A | 9/2013 |
| CN | 105838143 A | 8/2016 |
| CN | 109071986 A | 12/2018 |
| EP | 2397526 A1 | 12/2011 |
| JP | 2016-190996 A | 11/2001 |
| JP | 2009-190232 A | 8/2009 |
| JP | 2010-069805 A | 4/2010 |
| JP | 2010-070693 A | 4/2010 |
| JP | 2011-074336 A | 4/2011 |
| JP | 2011-184628 A | 9/2011 |
| JP | 2011-231315 A | 11/2011 |
| JP | 2012-001639 A | 1/2012 |
| JP | 2012001611 A * | 1/2012 |
| JP | 2013-072044 A | 4/2013 |
| JP | 2013-194226 A | 9/2013 |
| JP | 2016-194007 A | 11/2016 |
| JP | 2017-007331 A | 1/2017 |
| JP | 2017-128117 A | 7/2017 |
| JP | 6424413 B1 | 11/2018 |
| JP | 2019-094377 A | 6/2019 |
| JP | 2019-156995 A | 9/2019 |

(Continued)

OTHER PUBLICATIONS

English machine translation of JP-2012001611-A (Year: 2012).*

(Continued)

*Primary Examiner* — Amber R Orlando
*Assistant Examiner* — Jeffrey Eugene Barzach
(74) *Attorney, Agent, or Firm* — Sughrue Mion, PLLC

(57) ABSTRACT

Provided is an ink composition for inkjet recording containing water, a pigment, and a water-soluble polymer having a carboxy group, in which the water-soluble polymer satisfies the following expression (1), and the ink composition for inkjet recording is used for recording an ink image on a recording medium to which a pretreatment liquid including at least one aggregating agent selected from the group consisting of acids, cationic polymers, and polyvalent metal salts is applied:

$$230 \text{ mgKOH/g} \leq \Sigma(a \times b) \leq 750 \text{ mgKOH/g} \quad (1)$$

a means an acid value of the water-soluble polymer, in terms of mgKOH/g, and b means a content of the water-soluble polymer with respect to a total amount of the ink composition, in terms of % by mass.

10 Claims, No Drawings

(56) References Cited

FOREIGN PATENT DOCUMENTS

| | | |
|---|---|---|
| JP | 2019-162840 A | 9/2019 |
| JP | 2019-162841 A | 9/2019 |
| JP | 2020-070334 A | 5/2020 |
| WO | 2016/152580 A1 | 9/2016 |
| WO | 2017/159124 A1 | 9/2017 |
| WO | 2018/066474 A1 | 4/2018 |
| WO | 2018/142726 A1 | 8/2018 |
| WO | 2018/221674 A1 | 12/2018 |
| WO | 2019/013337 A1 | 1/2019 |
| WO | 2019/013338 A1 | 1/2019 |

OTHER PUBLICATIONS

Communication dated Sep. 15, 2023 issued by the Intellectual Property India Patent Office in application No. 202147048567.

International Search Report dated Jul. 14, 2021 in Application No. PCT/JP2020/017987.

Written Opinion of the International Searching Authority dated Jul. 14, 2021 in Application No. PCT/JP2020/017987.

International Preliminary Report on Patentability dated Sep. 28, 2021 with a Translation of the Written Opinion of the International Searching Authority in Application No. PCT/JP2020/017987.

Extended European Search Report dated May 16, 2022 in Application No. 20795487.6.

Communication dated May 20, 2022 from the Indian Intellectual Property Office in Application No. 202147048567.

Office Action dated Mar. 1, 2023 from the Chinese Patent Office in Application No. 202080031007.3.

Decision of Refusal dated May 9, 2023 from the Japanese Patent Office in Application No. 2021-516327.

Office Action issued Jul. 12, 2022 in Chinese Application No. 202080031007.3.

Notice of Reasons for Refusal dated Nov. 22, 2022 from the Japanese Patent Office in Application No. 2021-516327.

* cited by examiner

INK COMPOSITION FOR INKJET RECORDING, INK SET, AND IMAGE RECORDING METHOD

CROSS-REFERENCE TO RELATED APPLICATION

This application is a Continuation of International Application No. PCT/JP2020/017987, filed Apr. 27, 2020, which claims priority to Japanese Patent Application No. 2019-085858 filed Apr. 26, 2019. Each of the above applications is hereby expressly incorporated by reference, in its entirety, into the present application.

BACKGROUND OF THE INVENTION

1. Field of the Invention

The present disclosure relates to an ink composition for inkjet recording, an ink set, and an image recording method.

2. Description of the Related Art

An inkjet recording method is a method of recording an image by jetting liquid droplets of ink from a large number of nozzles provided in an inkjet head and fixing the liquid droplets on a recording medium. In recent years, it has been required to obtain a high-quality ink image while ensuring jetting stability by using the inkjet recording method.

In general, as a method of recording an ink image, a method of directly applying colored ink on a recording medium, a method of applying a pretreatment liquid on a recording medium and applying colored ink on the recording medium to which the pretreatment liquid has been applied, and the like have been known. The former system is called a one-liquid system, and the latter system is called a two-liquid system.

For example, as a colored ink used in the one-liquid system, JP6424413B discloses an aqueous inkjet ink containing at least water, a pigment, a water-soluble organic solvent, and a binder resin, in which the binder resin is a copolymer which has a structural unit having a carboxy group, and the acid value is 5 mgKOH/g or more and less than 60 mgKOH/g. In addition, JP2016-190996A discloses an aqueous inkjet yellow ink including water, a water-soluble solvent, a pigment, and a binder resin, in which the acid value of the binder resin is 100 or less. On the other hand, as a colored ink used in the two-liquid system, WO2016/152580A discloses an ink composition containing a binder resin, a surfactant, a pigment, and a solvent, in which a resin emulsion having a glass transition temperature of 40° C. to 90° C. is contained as the binder resin.

SUMMARY OF THE INVENTION

In order to obtain a high-quality ink image, it is necessary to suppress a phenomenon in which, after ink droplets land on a recording medium, adjacent ink droplets coalesce, that is, a landing interference. In JP6424413B and JP2016-190996A, it is considered that, since a surface tension of the colored ink is low and a permeation rate of the ink droplets into the recording medium is adjusted, the landing interference is suppressed. However, since the surface tension of the colored ink is low, there is a problem that the jetting stability is insufficient. In addition, since the permeation rate of the ink droplets differs depending on the type of the recording medium, it is necessary to adjust the surface tension for each type of the recording medium. On the other hand, in WO2016/152580A, after the ink droplets land on the recording medium to which the pretreatment liquid has been applied, the pretreatment liquid suppresses spread of the ink droplets, but it cannot be said that graininess is sufficient and further improvement in high image quality is required.

The present disclosure has been made in view of such circumstances, and according to embodiments of the present invention, an ink composition for inkjet recording, an ink set, and an image recording method, in which, in a case of recording an ink image on a recording medium to which a pretreatment liquid has been applied, it is possible to record an ink image having excellent jetting stability and good graininess, are provided.

The present disclosure includes the following aspects.

<1> An ink composition for inkjet recording comprising:
water;
a pigment; and
a water-soluble polymer having a carboxy group,
in which the water-soluble polymer satisfies the following expression (1), and
the ink composition for inkjet recording is used for recording an ink image on a recording medium to which a pretreatment liquid including at least one aggregating agent selected from the group consisting of acids, cationic polymers, and polyvalent metal salts is applied, $$230 \text{ mgKOH/g} \leq \Sigma(a \times b) \leq 750 \text{ mgKOH/g} \quad (1)$$

where a means an acid value of the water-soluble polymer, in terms of mgKOH/g, and b means a content of the water-soluble polymer with respect to a total amount of the ink composition, in terms of % by mass.

<2> The ink composition for inkjet recording according to <1>,
in which the acid value of the water-soluble polymer is 90 mgKOH/g or more.

<3> The ink composition for inkjet recording according to <1> or <2>,
in which a weight-average molecular weight of the water-soluble polymer is 25000 or less.

<4> The ink composition for inkjet recording according to any one of <1> to <3>,
in which a solubility parameter of the water-soluble polymer, which is calculated by an Okitsu method, is 21 $\text{MPa}^{1/2}$ to 23.5 $\text{MPa}^{1/2}$.

<5> The ink composition for inkjet recording according to any one of <1> to <4>,
in which water-insoluble resin particles are not contained, or
a content of the water-insoluble resin particles is 2.0% by mass or less with respect to the total amount of the ink composition.

<6> The ink composition for inkjet recording according to any one of <1> to <5>,
in which the water-soluble polymer is a copolymer which includes a structural unit derived from a hydrophobic monomer and a structural unit derived from a carboxy group-containing monomer.

<7> An ink set comprising:
a pretreatment liquid including at least one aggregating agent selected from the group consisting of acids, cationic polymers, and polyvalent metal salts; and
the ink composition for inkjet recording according to any one of <1> to <6>.

<8> The ink set according to <7>,
in which a pH of the pretreatment liquid is 5.0 or less.

<9> The ink set according to <7> or <8>,
in which the at least one aggregating agent is a carboxylic acid.
<10> An image recording method comprising:
a pretreatment liquid applying step of applying, to a recording medium, a pretreatment liquid including at least one aggregating agent selected from the group consisting of acids, cationic polymers, and polyvalent metal salts; and
an ink applying step of applying the ink composition for inkjet recording according to any one of <1> to <6> to the recording medium to which the pretreatment liquid has been applied by an inkjet recording method.

According to the present disclosure, it is possible to provide an ink composition for inkjet recording, an ink set, and an image recording method, in which, in a case of recording an ink image on a recording medium to which a pretreatment liquid has been applied, it is possible to record an ink image having excellent jetting stability and good graininess.

DESCRIPTION OF THE PREFERRED EMBODIMENTS

Hereinafter, an ink composition for inkjet recording, an ink set, and an image recording method according to an embodiment of the present disclosure will be described in detail.

In the present specification, the numerical ranges shown using "to" means ranges including the numerical values described before and after "to" as the minimum value and the maximum value.

In a numerical range described in a stepwise manner in the present specification, an upper limit value or a lower limit value described in a certain numerical range may be replaced with an upper limit value or a lower limit value in another numerical range described in a stepwise manner. In addition, in a numerical range described in the present specification, an upper limit value or a lower limit value described in a certain numerical range may be replaced with a value described in Examples.

In the present specification, in a case where a plurality of substances corresponding to each component in a composition is present, the amount of each component in the composition means the total amount of the plurality of substances present in the composition, unless otherwise specified.

In the present specification, a combination of two or more preferred aspects is a more preferred aspect.

In the present specification, the meaning of the term "step" includes not only an independent step but also a step whose intended purpose is achieved even in a case where the step is not clearly distinguished from other steps.

In the present specification, "(meth)acrylate" is a concept including both acrylate and methacrylate. "Water-soluble" means that solubility (25° C.) in 100 g of water is 10 g or more. On the other hand, "water-insoluble" means that solubility (25° C.) in 100 g of water is less than 10 g.

[Ink Composition]

The ink composition according to the embodiment of the present disclosure contains water, a pigment, and a water-soluble polymer having a carboxy group. Hereinafter, a polymer free from the pigment will be described as a "free polymer", and a water-soluble polymer which has a carboxy group and is free from the pigment will be described as a "water-soluble free polymer having a carboxy group". The "polymer free from the pigment" includes a polymer which is not adsorbed to the pigment at all, and a polymer which is adsorbed to the pigment but has a weak adsorbing power and is easily liberated. A specific method for quantifying the polymer free from the pigment will be described later. In the ink composition according to the embodiment of the present disclosure, the water-soluble free polymer having a carboxy group satisfies the following expression (1), and the ink composition for inkjet recording is used for recording an ink image on a recording medium to which a pretreatment liquid including at least one aggregating agent selected from the group consisting of acids, cationic polymers, and polyvalent metal salts is applied.

$$230 \text{ mgKOH/g} \leq \Sigma(a \times b) \leq 750 \text{ mgKOH/g} \quad (1)$$

In the expression (1), a means an acid value of the water-soluble free polymer having a carboxy group, in terms of mgKOH/g. b means a content of the water-soluble free polymer having a carboxy group with respect to a total amount of the ink composition, in terms of % by mass. In a case where one type of the water-soluble free polymer having a carboxy group is contained, $\Sigma(a \times b)$ is $a \times b$. In a case where two or more types of the water-soluble free polymer having a carboxy group are contained, $\Sigma(a \times b)$ is a total value obtained by calculating $a \times b$ for each polymer. For example, in a case where there are two types of the water-soluble free polymer having a carboxy group, a polymer 1 and a polymer 2, and the acid value of the polymer 1 is a1, the content of the polymer 1 is b1, the acid value of the polymer 2 is a2, and the content of the polymer 2 is b2, $(a \times b)$ is $a1 \times b1 + a2 \times b2$.

In a case where the polymer 1 and the polymer 2 are a mixture, the polymer 1 and the polymer 2 cannot be separated, and the acid value and the content of each polymer cannot be measured, by regarding an acid value of the mixture of the water-soluble free polymer having a carboxy group as a and regarding a content of the mixture of the water-soluble free polymer having a carboxy group with respect to the total amount of the ink composition as b, $\Sigma(a \times b)$ can be calculated. The reason is as follows. In a case where the acid value of the polymer 1 is a1, the content of the polymer 1 is b1, the acid value of the polymer 2 is a2, and the content of the polymer 2 is b2, the acid value of the mixture is $a1 \times \{b1/(b1+b2)\} + a2 \times \{b2/(b1+b2)\}$, and the content of the mixture is $b1+b2$. The product of the acid value of the mixture and the content of the mixture is $a1 \times b1 + a2 \times b2$. This value is the same as the value calculated by separating the polymer 1 and the polymer 2, and measuring the acid value and the content of each polymer.

The ink composition according to the embodiment of the present disclosure is applied, by an inkjet recording method, to a recording medium to which a pretreatment liquid including at least one aggregating agent selected from the group consisting of acids, cationic polymers, and polyvalent metal salts has been applied. The ink composition according to the embodiment of the present disclosure is jetted as liquid droplets from a large number of nozzles provided in an inkjet head and landed on the recording medium, a solvent contained in the liquid droplets (hereinafter, referred to as "ink droplets") composed of the ink composition evaporates to form fixed dots. In the present disclosure, since the pretreatment liquid is previously applied to the recording medium, in a case where the ink droplets come into contact with the pretreatment liquid, the pigments contained in the ink droplets aggregate with each other. In addition, in a case where the ink droplets come into contact with the pretreatment liquid, since the water-soluble free polymers having a carboxy group contained in the ink droplets are insolubilized and form hydrogen bonds with each other, viscosity of the ink droplets increases. In particular, in the ink composition according to the embodiment of the present disclosure, since the water-soluble free polymer having a carboxy group satisfies the expression (1), the effect of increasing the viscosity of the ink droplets is high. Therefore, in a case of using the ink composition according to the embodiment of the present disclosure, it is considered that the ink droplets are fixed without spreading too much, so that a landing interference is suppressed.

The landing interference is a phenomenon in which, after the ink droplets land on the recording medium, adjacent ink droplets coalesce. Specifically, it is a phenomenon in which, in a case where second ink droplets land adjacent to first ink droplets after the first ink droplets has landed, due to the first ink droplets spreading too much, the second ink droplets come into contact with the first ink droplets and coalesce. The second ink droplets may be attracted to the first ink droplets by a surface tension of the first ink droplets, and may deviate from a landing position of the second ink droplets. The pigment concentration at a portion where the adjacent ink droplets coalesce is higher than that at a portion where the adjacent ink droplets do not coalesce. As an ink image, uneven density will occur. As for the appearance, the ink image provides a rough feel, and it is generally said that "graininess" is poor. In a case of using the ink composition according to the embodiment of the present disclosure, since the landing interference is suppressed as described above, an ink image having good graininess can be obtained. In addition, in the ink composition according to the embodiment of the present disclosure, since the water-soluble free polymer having a carboxy group satisfies the expression (1), it is considered that an aggregation rate of the pigment is appropriately adjusted after the ink droplets land on the recording medium. In a case where the aggregation rate of the pigment is too high, in a case where the ink droplets are fixed on the recording medium, the pigment concentration near a center of the dots is high in the entire dots. As an ink image, uneven density will occur. That is, in a case where the aggregation rate of the pigment is too high, the graininess deteriorates. In a case of using the ink composition according to the embodiment of the present disclosure, as described above, since the aggregation rate of the pigment is appropriately adjusted, it is considered that the dots are formed in a state in which the pigments are arranged relatively uniformly. As a result, it is considered that an ink image having good graininess can be obtained.

In addition, in the ink composition according to the embodiment of the present disclosure, since the water-soluble free polymer having a carboxy group satisfies the expression (1), it is difficult to adhere to the nozzle, and jetting stability is excellent.

Hereinafter, each component contained in the ink composition according to the embodiment of the present disclosure will be described.

(Pigment)

The ink composition according to the embodiment of the present disclosure contains a pigment. The pigment can be contained in the ink composition as a pigment dispersion dispersed in an aqueous medium using a pigment dispersant. In addition, the pigment may be a self-dispersing pigment which has a polar group on a surface of the pigment and can be dispersed in the aqueous medium without using a pigment dispersant.

The type of the pigment is not particularly limited, and any commercially available organic pigment or inorganic pigment can be used. Examples of the pigment include pigments described in "Encyclopedia of Pigments" edited by Seishiro Ito (published by Asakura Shoten in 2000), "Industrial Organic Pigments" edited by W. Herbst and K. Hunger (published by Wiley-VCH in 2019), JP2002-12607A, JP2002-188025A, JP2003-26978A, and JP2003-342503A.

The average particle diameter of the pigment is preferably 10 nm to 200 nm, more preferably 10 nm to 150 nm, and still more preferably 10 nm to 110 nm. In a case where the average particle diameter is 200 nm or less, color reproducibility is good and jetting stability is good. On the other hand, in a case where the average particle diameter is 10 nm or more, light resistance is good. In addition, the particle size distribution of the pigment may be either a wide particle size distribution or a monodisperse particle size distribution. The average particle diameter and particle size distribution of the pigment are acquired by measuring the volume average particle diameter using a particle size distribution measurement apparatus, for example, product name "nanotrac UPA-EX150" manufactured by Nikkiso Co., Ltd. according to a dynamic light scattering method. In addition, in a case where the pigment is coated with a pigment dispersant, the average particle diameter of the pigment means an average particle diameter of the pigment coated with the pigment dispersant.

From the viewpoint of ink image density, the content of the pigment is preferably 1% by mass to 25% by mass, more preferably 2% by mass to 20% by mass, and still more preferably 2% by mass to 10% by mass with respect to the total amount of the ink composition.

In the ink composition according to the embodiment of the present disclosure, from the viewpoint of appropriately adjusting the aggregation rate of the pigment after the ink droplets land, it is preferable that the pigment is dispersed by a pigment dispersant. That is, it is preferable that the pigment dispersant is adsorbed on the pigment and at least a part of the pigment is coated.

As the pigment dispersant, a generally known pigment dispersant can be used, and examples thereof include a surfactant and a polymer having both a hydrophilic structure and a hydrophobic structure. Among these, from the viewpoint of dispersion stability, the pigment dispersant is preferably a polymer having both a hydrophilic structure and a hydrophobic structure.

Examples of the surfactant include surfactants such as higher fatty acid salt, alkyl sulfate, alkyl ester sulfate, alkyl sulfonate, sulfosuccinate, naphthalene sulfonate, alkyl phosphate, polyoxyalkylene alkyl ether phosphate, polyoxyalkylene alkyl phenyl ether, polyoxyethylene polyoxypropylene glycol, glycerin ester, sorbitan ester, polyoxyethylene fatty acid amide, and amine oxide. Examples of the polymer having both a hydrophilic structure and a hydrophobic structure include a polymer obtained by copolymerizing a hydrophilic monomer and a hydrophobic monomer. The polymer may be either a random copolymer or a block copolymer.

From the viewpoint of dispersion stability, as the hydrophilic monomer, a dissociable group-containing monomer is preferable, and a dissociable group-containing monomer which has a dissociable group and an ethylenically unsaturated bond is more preferable. Examples of the dissociable group-containing monomer include a carboxy group-containing monomer, a sulfonic acid group-containing monomer, and a phosphoric acid group-containing monomer.

Specific examples of the carboxy group-containing monomer include acrylic acid, methacrylic acid, crotonic acid, itaconic acid, maleic acid, fumaric acid, citraconic acid, and 2-methacryloyloxymethylsuccinic acid. Specific examples of the sulfonic acid group-containing monomer include styrenesulfonic acid, 2-acrylamido-2-methylpropanesulfonic acid, 3-sulfopropyl (meth)acrylate, and bis-(3-sulfopropyl)-itaconic acid ester. Specific examples of the phosphoric acid group-containing monomer include vinyl phosphonic acid, vinyl phosphate, bis(acryloxyethyl) phosphate, bis(methacryloxyethyl) phosphate, diphenyl-2-acryloxyethyl phosphate, diphenyl-2-methacryloyloxyethyl phosphate, and dibutyl-2-acryloxyethyl phosphate.

Among the dissociable group-containing monomers, from the viewpoint of dispersion stability, a carboxy group-containing monomer is preferable, and acrylic acid or methacrylic acid is more preferable.

Examples of hydrophilic monomers other than the dissociable group-containing monomer include hydroxyl group-containing (meth)acrylates such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, and hydroxyhexyl (meth)acrylate. Among these, as the hydrophilic monomer, 2-hydroxyethyl (meth)acrylate is preferable. The hydrophilic monomer may be used alone or in combination of two or more kinds thereof.

From the viewpoint of dispersion stability, the hydrophobic monomer is preferably an aromatic group-containing monomer which has an aromatic group and an ethylenically unsaturated bond, or an aliphatic hydrocarbon group-containing monomer which has an aliphatic hydrocarbon group and an ethylenically unsaturated bond.

Examples of the aromatic group-containing monomer include aromatic group-containing (meth)acrylates such as phenoxyethyl (meth)acrylate, benzyl (meth)acrylate, phenyl (meth)acrylate, 2-naphthyl (meth)acrylate, and 9-anthracenyl (meth)acrylate; and styrene monomers such as styrene, α-methylstyrene, t-butylstyrene, p-methylstyrene, o-methoxystyrene, m-methoxystyrene, p-methoxystyrene, o-t-butoxystyrene, m-t-butoxystyrene, p-t-butoxystyrene, o-chloromethylstyrene, m-chloromethylstyrene, and p-chloromethylstyrene. Among these, from the viewpoint of balance between hydrophilicity and hydrophobicity of the polymer chain and fixing property of the ink composition, the aromatic group-containing monomer is preferably an aromatic group-containing (meth)acrylate, more preferably at least one monomer selected from the group consisting of phenoxyethyl (meth)acrylate, benzyl (meth)acrylate, and phenyl (meth)acrylate, and still more preferably phenoxyethyl (meth)acrylate or benzyl (meth)acrylate.

Examples of the aliphatic hydrocarbon group-containing monomer include olefines such as ethylene, propylene, 1-butene, and isobutene; linear or branched aliphatic hydrocarbon group-containing (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, n-amyl (meth)acrylate, i-amyl (meth)acrylate, 2-ethylhexyl (meth)acrylate, n-octyl (meth)acrylate, i-octyl (meth)acrylate, decyl (meth)acrylate, i-decyl (meth)acrylate, n-dodecyl (meth)acrylate, i-dodecyl (meth)acrylate, stearyl (meth)acrylate, i-stearyl (meth)acrylate, behenyl (meth)acrylate; and cyclic aliphatic hydrocarbon group-containing (meth)acrylates such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, cyclodecyl (meth)acrylate, isobornyl (meth)acrylate, norbornyl (meth)acrylate, and adamantyl (meth)acrylate. Among these, from the viewpoint of balance between hydrophilicity and hydrophobicity of the polymer chain and fixing property of the ink composition, the aliphatic hydrocarbon group-containing monomer is preferably a linear aliphatic hydrocarbon group-containing (meth)acrylate, and more preferably stearyl (meth)acrylate. The hydrophobic monomer may be used alone or in combination of two or more kinds thereof.

The weight-average molecular weight of the pigment dispersant is preferably 25000 or less, more preferably 1000 to 20000, still more preferably 3000 to 18000, and particularly preferably 5000 to 15000. The weight-average molecular weight is a value measured by gel permeation chromatography (GPC). The specific measurement conditions are as follows.

The weight-average molecular weight is measured by gel permeation chromatography (GPC). Specifically, product name "HLC-8020GPC" manufactured by Tosoh Corporation is used as GPC, three columns of product name "TSKgel, SuperMultipore HZ-H" (4.6 mmID×15 cm) manufactured by Tosoh Corporation are used as a column, and tetrahydrofuran (THF) is used as an eluent. The measurement is performed under conditions of a sample concentration of 0.45% by mass, a flow rate of 0.35 ml/min, a sample injection amount of 10 and a measurement temperature of 40° C. using an IR detector. A calibration curve is obtained from, as a standard sample, eight samples of product names "TSK Standard polystyrene" manufactured by Tosoh Corporation: "F-40", "F-20", "F-4", "F-1", "A-5000", "A-2500", "A-1000", and "n-propylbenzene".

The acid value of the pigment dispersant is not particularly limited, but from the viewpoint of dispersion stability, is preferably 90 mgKOH/g or more and more preferably 90 mgKOH/g to 400 mgKOH/g. The acid value of the pigment dispersant is a value calculated by measuring in accordance with JIS K0070: 1992 and converting as 1 mmol/g=56.1 mgKOH/g.

From the viewpoint of storage stability as a pigment dispersion, the mixing mass ratio of the pigment and the pigment dispersant (pigment:pigment dispersant) is preferably 1:0.06 to 1:1, more preferably 1:0.125 to 1:0.6, and still more preferably 1:0.2 to 1:0.5. The pigment dispersion can be produced by a generally known dispersion method using water, a pigment, a pigment dispersant, and as necessary, other components as raw materials, with a generally known dispersion apparatus.

(Water-Soluble Free Polymer having Carboxy Group)

The ink composition according to the embodiment of the present disclosure contains a water-soluble free polymer having a carboxy group. The water-soluble free polymer having a carboxy group satisfies the following expression (1). In the expression (1), a means an acid value of the water-soluble free polymer having a carboxy group, in terms of mgKOH/g, and b means a content of the water-soluble free polymer having a carboxy group with respect to a total amount of the ink composition, in terms of % by mass.

$$230 \text{ mgKOH/g} \leq \Sigma(a \times b) \leq 750 \text{ mgKOH/g} \quad (1)$$

The ink composition according to the embodiment of the present disclosure is produced by, for example, producing a pigment dispersion in advance using water, a pigment, and a pigment dispersant, and mixing the pigment dispersion with a water-soluble polymer having a carboxy group. In the pigment dispersion, a pigment dispersant which is adsorbed on the pigment by hydrophobic interaction and coats the pigment, and a pigment dispersant which is not adsorbed on the pigment and is free from the pigment are present. Therefore, in a case where a water-soluble polymer having a carboxy group is used as the pigment dispersant, the pigment dispersant free from the pigment and the water-soluble polymer having a carboxy group, which is mixed with the pigment dispersion, correspond to the "water-soluble free polymer having a carboxy group" in the present disclosure. Accordingly, in a case where a water-soluble polymer having a carboxy group is used as the pigment dispersant, $\rho(a \times b)$ is calculated based on the acid value and content of the pigment dispersant free from the pigment and the acid value and content of the water-soluble polymer having a carboxy group, which is mixed with the pigment dispersion. The pigment dispersant and the water-soluble polymer having a carboxy group to be mixed later may be the same. In addition, the water-soluble polymer having a carboxy group to be mixed later may be one kind or two or more kinds.

In addition, the ink composition according to the embodiment of the present disclosure is produced by, for example, mixing water, a self-dispersing pigment, and a water-soluble polymer having a carboxy group. The self-dispersing pigment can be dispersed in an aqueous medium without using the pigment dispersant. Therefore, the water-soluble polymer having a carboxy group, which is mixed with the self-dispersing pigment, is not adsorbed on the self-dispersing pigment and is free from the self-dispersing pigment in the ink composition. The water-soluble polymer having a carboxy group, which is mixed with the self-dispersing pigment, corresponds to the "water-soluble free polymer having a carboxy group" in the present disclosure. Accordingly, $\Sigma(a \times b)$ is calculated based on the acid value and content of the water-soluble polymer having a carboxy group, which is mixed with the self-dispersing pigment. In addition, the water-soluble polymer having a carboxy group to be mixed with the self-dispersing pigment may be one kind or two or more kinds.

Next, a method for calculating $\Sigma(a \times b)$ will be described.

First, the ink composition is centrifuged using a centrifuge, for example, product name "himac CS150FNX" manufactured by Koki Holdings Co., Ltd. under conditions of a weight acceleration of 343,000×g for 30 minutes to recover the supernatant solution after removing the precipitate. The water-soluble polymer having a carboxy group, which is included in the recovered supernatant solution, is regarded as the "water-soluble free polymer having a carboxy group". The amount of the water-soluble polymer having a carboxy group, which is included in the recovered supernatant solution, is measured after heating the recovered supernatant solution to 100° C. to 150° C. under reduced pressure to completely remove the solvent. In addition, the acid value of the water-soluble polymer having a carboxy group, which is included in the recovered supernatant solution, is calculated by measuring in accordance with JIS K0070: 1992 and converting as 1 mmol/g=56.1 mgKOH/g. In addition, the content of the water-soluble polymer having a carboxy group with respect to the total amount of the ink composition is calculated based on the amount of the water-soluble polymer having a carboxy group, which is included in the recovered supernatant solution, and the amount of the ink composition. $\Sigma(a \times b)$ is the product of the calculated acid value and the calculated content. Even in a case where two or more types of the water-soluble polymers having a carboxy group, which are included in the recovered supernatant solution, are used, $\Sigma(a \times b)$ can be calculated by the same method without separating by type.

In the ink composition according to the embodiment of the present disclosure, since $\Sigma(a \times b)$ of the water-soluble free polymer having a carboxy group is 230 mgKOH/g to 750 mgKOH/g, an ink image having excellent jetting stability and good graininess can be obtained. $\Sigma(a \times b)$ is preferably 300 mgKOH/g to 600 mgKOH/g. In a case where $\Sigma(a \times b)$ is 230 mgKOH/g to 750 mgKOH/g, since the water-soluble free polymer having a carboxy group is insolubilized, the effect of increasing the viscosity of ink droplets is high, and the aggregation rate of the pigment is appropriately adjusted, an ink image having good graininess can be obtained. In addition, since $\Sigma(a \times b)$ is 750 mgKOH/g or less, the water-soluble free polymer having a carboxy group does not easily adhere to the nozzle and has excellent jetting stability.

It is sufficient that the water-soluble free polymer having a carboxy group have a carboxy group, and a structure thereof is not particularly limited. However, from the viewpoint that the content of carboxy groups per one molecule is required to some extent in order to satisfy the expression (1), the water-soluble free polymer having a carboxy group is preferably a copolymer including a structural unit derived from the hydrophobic monomer and a structural unit derived from the carboxy group-containing monomer.

Examples of the hydrophobic monomer include an aromatic group-containing monomer which has an aromatic group and an ethylenically unsaturated bond and an aliphatic hydrocarbon group-containing monomer which has an aliphatic hydrocarbon group and an ethylenically unsaturated bond, and specific examples thereof include the above.

Specific examples of the carboxy group-containing monomer include the above. Among these, the carboxy group-containing monomer is preferably acrylic acid or methacrylic acid.

From the viewpoint of improving jetting stability, the acid value of the water-soluble free polymer having a carboxy group is preferably 90 mgKOH/g or more. In addition, in a case where two or more kinds of water-soluble free polymers having a carboxy group are contained, the acid value of the free polymer having a content of more than 50% by mass in the two or more kinds of the free polymers is preferably 100 mgKOH/g to 500 mgKOH/g, more preferably 150 mgKOH/g to 400 mgKOH/g, and still more preferably 200 mgKOH/g to 270 mgKOH/g. The acid value of the water-soluble free polymer having a carboxy group is a value calculated by measuring in accordance with JIS K0070: 1992 and converting as 1 mmol/g=56.1 mgKOH/g.

From the viewpoint of improving jetting stability, the weight-average molecular weight of the water-soluble free polymer having a carboxy group is preferably 25000 or less, more preferably 1000 to 25000, and still more preferably 3000 to 20000. The weight-average molecular weight is a value measured by gel permeation chromatography (GPC). The specific measurement conditions are as described above.

From the viewpoint of improving jetting stability, the solubility parameter (SP value) of the water-soluble free polymer having a carboxy group, which is calculated by an Okitsu method, is preferably 21 $MPa^{1/2}$ to 23.5 $MPa^{1/2}$. In addition, in a case where two or more kinds of water-soluble free polymers having a carboxy group are present, the SP value of the free polymer having a content of more than 50% by mass in the two or more kinds of the free polymers, which is calculated by the Okitsu method, is preferably 22 $MPa^{1/2}$ to 23.5 $MPa^{1/2}$ and more preferably 22 $MPa^{1/2}$ to 23 $MPa^{1/2}$. The Okitsu method is a method of calculating the SP value using a theoretical expression (theoretical expression of SP value proposed by Toshinao Okitsu) described in Journal of the Japanese Society of Adhesion Vol. 29, No. 6 (1993), pp. 249 to 259.

(Water)

The ink composition according to the embodiment of the present disclosure preferably contains water. The content of the water is not particularly limited, but is preferably 10% by mass to 99% by mass, more preferably 30% by mass to 80% by mass, and still more preferably 50% by mass to 70% by mass with respect to the total amount of the ink composition.
(Resin Particles)

The ink composition according to the embodiment of the present disclosure may contain water-insoluble resin particles. In the present disclosure, the resin particles refer to polymers having a weight-average molecular weight of 3000 or more and in a form of particles. From the viewpoint of jetting stability, it is preferable that the ink composition according to the embodiment of the present disclosure contains substantially no water-insoluble resin particles. That is, from the viewpoint of jetting stability, the ink composition according to the embodiment of the present disclosure does not contain the water-insoluble resin particles, or in a case of containing the water-insoluble resin particles, the content of the water-insoluble resin particles is preferably 2.0% by mass or less and more preferably 1.0% by mass or less with respect to the total amount of the ink composition.

Examples of the resin particles include particles of acrylic resin, epoxy resin, urethane resin, olefin resin, polyether, polyamide, unsaturated polyester, phenol resin, silicone resin, fluororesin; vinyl resins such as polyvinyl chloride, polyvinyl acetate, polyvinyl alcohol, and polyvinyl butyral; and alkyd resin, phthalic acid resin, melamine resin, melamine formaldehyde resin, aminoalkyd resin, and urea resin. Examples of the acrylic resin include a polymer having an anionic group-containing (meth)acrylate and a hydrophobic group-containing (meth)acrylate as structural units.

In a case of containing the resin particles, from the viewpoint of jetting stability, the resin particles are preferably self-dispersing resin particles. Here, the self-dispersing resin indicates a water-insoluble polymer which may be in a state of being dispersed in an aqueous medium by a functional group (particularly an acidic group or a salt thereof) included in a polymer in a case where the polymer is set to be in a dispersion state using a phase-transfer emulsification method in the absence of a surfactant.

In the present disclosure, the weight-average molecular weight of the polymer constituting the resin particles is 3000 or more, preferably 5000 to 50000 and more preferably 8000 to 30000. The weight-average molecular weight is a value measured by gel permeation chromatography (GPC). The specific measurement conditions are as described above.
(Wax)

The ink composition according to the embodiment of the present disclosure may contain wax. The wax means a polymer having a melting point of 170° C. or lower. The melting point means a temperature of a top endothermic peak in a measurement using a differential scanning calorimetry (DSC), for example, a differential scanning calorimetry (product name: "EXSTAR6220", manufactured by Hitachi High-Tech Science Corporation). In addition, in the present disclosure, the wax refers to a wax having a weight-average molecular weight of less than 3000, and is distinguished from the above-described resin particles.

Examples of the wax include vegetable waxes such as camauba wax, candelilla wax, and rice wax; animal waxes such as mitsuro and lanolin; petroleum waxes such as paraffin wax, microcrystallin wax, and petrolatum; mineral waxes such as Montan wax and Ozokerite; and synthetic waxes such as ester wax, polyethylene wax, polyethylene oxide wax, polyolefin wax, stearic acid amide, and α-olefin/maleic acid anhydride copolymer.

From the viewpoint of jetting stability, the content of the wax is preferably 3% by mass or less and more preferably 2% by mass or less with respect to the total amount of the ink composition.

The wax is preferably used in a form of a dispersion liquid dispersed in water. By pre-dispersing the wax, it is possible to suppress aggregation with other components contained in the ink composition, thereby improving storage stability. The concentration of the aqueous dispersion liquid of the wax is not particularly limited, but is, for example, 20% by mass to 60% by mass. As an emulsifier which disperses the wax, a known emulsifier can be used.

The weight-average molecular weight of the wax is preferably 300 or more and less than 3000, and more preferably 500 to 2500. The weight-average molecular weight is a value measured by gel permeation chromatography (GPC). The specific measurement conditions are as described above.
(Organic Solvent)

The ink composition according to the embodiment of the present disclosure preferably further contains an organic solvent. By containing an organic solvent, particularly a water-soluble organic solvent, it is possible to prevent the ink composition from drying in the vicinity of the nozzle and promote permeation into the recording medium.

In order to prevent drying, a water-soluble organic solvent having a lower vapor pressure than that of water is preferable. Specific examples of a suitable water-soluble organic solvent for the purpose of preventing drying include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerin, and trimethylolpropane; lower alkyl ethers of polyhydric alcohol, such as ethylene glycol monomethyl ether, ethylene glycol monoethyl ether, diethylene glycol monomethyl ether, diethylene glycol monomethyl ethyl ether, triethylene glycol monoethyl ether, triethylene glycol monobutyl ether, tripropylene glycol monomethyl ether, and tripropylene glycol monoethyl ether; heterocycles such as 2-pyrrolidone, N-methyl-2-pyrrolidone, 1,3-dimethyl-2-imidazolidinone, and N-ethyl morpholine; sulfur-containing compounds such as sulfolane, dimethyl sulfoxide, and 3-sulfolene; polyfunctional compounds such as diacetone alcohol and diethanolamine; and urea and urea derivatives. Among these, the water-soluble organic solvent is preferably a polyhydric alcohol and more preferably glycerin or propylene glycol. The content of these water-soluble organic solvents is preferably 10% by mass to 50% by mass with respect to the total amount of the ink composition.

In addition, specific examples of the water-soluble organic solvent suitable for promoting permeation include ethanol, isopropanol, butanol, diethylene glycol monobutyl ether, triethylene glycol monobutyl ether, tripropylene glycol monomethyl ether, tripropylene glycol monoethyl ether, and 1,2-hexanediol. The content of these water-soluble organic solvents is preferably 5% by mass to 30% by mass with respect to the total amount of the ink composition.

In addition, the water-soluble organic solvent can be contained for the purpose of adjusting the viscosity. Specific examples of the water-soluble organic solvent suitable for adjusting the viscosity include alcohols (for example, methanol, ethanol, propanol, isopropanol, butanol, isobutanol, sec-butanol, t-butanol, pentanol, hexanol, cyclohexanol, or benzyl alcohol); polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol); glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, tripropylene glycol monomethyl ether, tripropylene glycol monoethyl ether, triethylene glycol monomethyl ether, ethylene glycol diacetate, ethylene glycol monomethyl ether acetate, triethylene glycol monoethyl ether, or ethylene glycol monophenyl ether); amines (for example, ethanolamine, diethanolamine, triethanolamine, N-methyl diethanolamine, N-ethyl diethanolamine, morpholine, N-ethyl morpholine, ethylene diamine, diethylene triamine, triethylene tetramine, polyethyleneimine, or tetramethyl propylene diamine); and other polar solvents (for example, formamide, N,N-dimethyl formamide, N,N-dimethyl acetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). The content of these water-soluble organic solvents is preferably 10% by mass to 50% by mass with respect to the total amount of the ink composition. The water-soluble organic solvent may be used alone or in combination of two or more kinds thereof.

(Surfactant)

The ink composition according to the embodiment of the present disclosure preferably contains a surfactant. Examples of the surfactant include a nonionic surfactant, a cationic surfactant, an anionic surfactant, and a betaine surfactant. From the viewpoint of aggregation rate, the surfactant is preferably an anionic surfactant or a nonionic surfactant.

(Additive)

The ink composition according to the embodiment of the present disclosure may further contain an additive other than the above-described components. Examples of the additive include known additives such as a discoloration preventer, an emulsification stabilizer, a penetration enhancer, an ultraviolet absorbing agent, a preservative, an antibacterial agent, a pH adjusting agent, an antifoaming agent, a viscosity-adjusting agent, a dispersion stabilizer, a rust inhibitor, and a chelating agent.

As the PH adjusting agent, a neutralizing agent (organic base or inorganic base) can be used. From the viewpoint of improving storage stability of the ink composition, it is preferable that the pH adjusting agent is added to the ink composition such that the pH of the ink composition is adjusted to be in a range of 6 to 10, and it is more preferable that the pH adjusting agent is added to the ink composition such that the pH of the ink composition is adjusted to be in a range of 7 to 10.

The surface tension of the ink composition is not particularly limited, but for example, is preferably 25 mN/m or more, more preferably 25 mN/m to 60 mN/m, and still more preferably 25 mN/m to 45 mN/m. The surface tension of the ink composition can be adjusted, for example, by the type and content of the surfactant contained in the ink composition. The surface tension of the ink composition is measured by a plate method using a surface tensiometer, for example, product name "Fully Automatic Surface Tensiometer CBVP-Z" manufactured by Kyowa Interface Science Co., Ltd. under the condition of 25° C.

From the viewpoint of jetting stability and aggregation rate in a case of jetting by the inkjet recording method, the viscosity of the ink composition is preferably 1 mPa·s to 30 mPa·s, more preferably 1 mPa·s to 20 mPa·s, still more preferably 2 mPa·s to 15 mPa·s, and particularly preferably 2 mPa·s to 10 mPa·s. The viscosity of the ink composition is measured under the condition of 25° C. using a rotary viscometer, for example, product name "VISCOMETER TV-22" manufactured by TOM SANGYO CO., LTD.

[Pretreatment Liquid]

The pretreatment liquid is applied to the recording medium in advance before the ink composition is jetted by the inkjet recording method. The ink composition is jetted onto the recording medium coated with the pretreatment liquid and comes into contact with the pretreatment liquid on the recording medium.

The pretreatment liquid of the present disclosure including at least one aggregating agent selected from the group consisting of acids, cationic polymers, and polyvalent metal salts. In the ink composition according to the embodiment of the present disclosure, in a case where the pigment is coated with the pigment dispersant, the pigments are dispersed in the ink composition without aggregation due to electrostatic repulsion between the pigment dispersants. In addition, in a case of the self-dispersing pigment, the self-dispersing pigments are dispersed in the ink composition due to electrostatic repulsion between the self-dispersing pigments. In the present disclosure, since the pretreatment liquid includes at least one aggregating agent selected from the group consisting of acids, cationic polymers, and polyvalent metal salts, in a case where the ink composition comes into contact with the pretreatment liquid, charge of the pigment dispersant or the self-dispersing pigment is lost, and the aggregation of the pigments is promoted. In addition, the water-soluble free polymer having a carboxy group is insolubilized in a case where the ink composition comes into contact with the pretreatment liquid.

(Acid)

Examples of the acid include carboxylic acid, sulfuric acid, hydrochloric acid, nitric acid, and phosphoric acid. Among these, the acid is preferably carboxylic acid. Since the carboxylic acid is a weak acid, the pH of the pretreatment liquid does not decrease so much even in a case where the carboxylic acid is contained in a large amount in the pretreatment liquid. Since the decrease in pH is suppressed, it is possible to suppress corrosion of members used in a case of handling the pretreatment liquid by the pretreatment liquid. By containing a large amount of carboxylic acid in the pretreatment liquid, it is possible to enhance aggregation effect of the pigments in the ink composition.

From the viewpoint of enhancing the aggregation effect, the carboxylic acid is preferably a compound including two or more carboxy groups in one molecule. As the compound including two or more carboxy groups in one molecule, tartaric acid, phthalic acid, 4-methylphthalic acid, DL-malic acid, succinic acid, citric acid, pimelic acid, malonic acid, glutaric acid, adipic acid, dimethylmalonic acid, or maleic acid is preferable, and DL-malic acid, malonic acid, succinic acid, citric acid, glutaric acid, dimethylmalonic acid, or maleic acid is more preferable. The acid may be used alone or in combination of two or more.

In addition, as the carboxylic acid, a compound represented by General Formula (I) is also suitable. The compound represented by General Formula has a higher aggregation effect, and movement of the pigment after the ink droplets have landed is further suppressed.

$$C_nH_{2n+2-m}(COOH)_m \qquad \text{General formula (I)}$$

[in General Formula (I), n represents an integer of 2 or more, and m represents an integer of 3 or more]

In General Formula (I), n is preferably an integer of 3 to 5. m is preferably an integer of 3 to 5.

Specific examples of the compound represented by General Formula (I) include 1,2,3-propanetricarboxylic acid, 1,3,5-pentanetricarboxylic acid, and 1,2,3,4-butanetetracarboxylic acid.

The pretreatment liquid of the present disclosure preferably further contains a salt of the carboxylic acid. In a case where the pretreatment liquid contains a salt of the carboxylic acid, the pH of the pretreatment liquid can be raised to some extent without impairing the aggregation function of the carboxylic acid. As a result, a high-quality ink image can be obtained, and the corrosion of the members by the pretreatment liquid can be suppressed.

The salt of the carboxylic acid can be obtained, for example, by neutralizing a part of the carboxylic acid with a basic compound. The basic compound is not particularly limited as long as it can be neutralized, and examples thereof include alkali metal hydroxides and alkaline earth metal hydroxides. Among these, from the viewpoint of solubility, the basic compound is preferably an alkali metal hydroxide. That is, a salt of the carboxylic acid which is obtained by neutralizing a part of the carboxylic acid with an alkali metal hydroxide is an alkali metal salt of the carboxylic acid.

Examples of the alkali metal hydroxide and the alkaline earth metal hydroxide include potassium hydroxide, sodium hydroxide, magnesium hydroxide, and calcium hydroxide. Among these, from the viewpoint of solubility, the basic compound is preferably sodium hydroxide or potassium hydroxide.

The pretreatment liquid of the present disclosure may contain an acid other than the carboxylic acid, and a salt thereof. The pretreatment liquid of the present disclosure preferably further contains phosphoric acid and a salt of the phosphoric acid as the acid other than the carboxylic acid and a salt thereof. In a case where the recording medium contains calcium carbonate, by containing phosphoric acid in the pretreatment liquid, the reaction between the calcium carbonate and the phosphoric acid in the pretreatment liquid can prevent calcium in the calcium carbonate from insolubilizing and precipitating on the recording medium.

Examples of the phosphoric acid include orthophosphoric acid (hereinafter, also simply referred to as "phosphoric acid"), phosphorous acid, hypophosphorous acid, pyrophosphoric acid, metaphosphoric acid, and polyphosphoric acid.

(Cationic Polymer)

Examples of the cationic polymer include a cationic urethane resin, a cationic acrylic resin, a cationic vinyl resin, a cationic olefin resin, a cationic polyamine, and a cationic allylamine resin.

(Polyvalent Metal Salt)

The polyvalent metal salt is composed of a divalent or higher polyvalent metal ion and an anion. Examples of the polyvalent metal ion include $Ca^{2+}$, $Cu^{2+}$, $Ni^{2+}$, $Mg^{2+}$, $Zn^{2+}$, $Ba^{2+}$, $Al^{3+}$, $Fe^{3+}$, and $Cr^{3+}$. In addition, examples of the anion include $Cl^-$, $I^-$, $Br^-$, $SO_4^{2-}$, $ClO^{3-}$, and $NO^{3-}$.

(Water)

The pretreatment liquid of the present disclosure preferably contains water. The content of the water is not particularly limited, but is preferably 10% by mass to 99% by mass, more preferably 50% by mass to 90% by mass, and still more preferably 60% by mass to 80% by mass with respect to the total amount of the pretreatment liquid.

(Organic Solvent)

The pretreatment liquid of the present disclosure preferably contains an organic solvent. As the organic solvent, an organic solvent (hereinafter, also referred to as a "water-soluble organic solvent") to be dissolved in 100 g of water at 20° C. by an amount of 5 g or more is preferable. As the water-soluble organic solvent, the same solvent as the water-soluble organic solvent contained in the ink composition can be used. Among these, from the viewpoint of suppressing curl of the recording medium and reducing the surface tension of the pretreatment liquid to improve coatability, the organic solvent is preferably polyalkylene glycol or a derivative thereof, and more preferably at least one selected from the group consisting of diethylene glycol monoalkyl ether, triethylene glycol monoalkyl ether, dipropylene glycol, tripropylene glycol monoalkyl ether, polyoxypropylene glyceryl ether, and polyoxyethylene polyoxypropylene glycol.

The content of the organic solvent is not particularly limited, but from the viewpoint of suppressing curl of the recording medium and reducing the surface tension of the pretreatment liquid to improve coatability, the content thereof is preferably 0.5% by mass to 30% by mass and more preferably 0.5% by mass to 10% by mass with respect to the total amount of the pretreatment liquid.

(Water-Soluble Polymer)

The pretreatment liquid of the present disclosure preferably contains a water-soluble polymer. The weight-average molecular weight of the water-soluble polymer is preferably 5000 or more. In a case where the weight-average molecular weight of the water-soluble polymer is 5000 or more, it is possible to prevent the water-soluble polymer from penetrating too much into the recording medium. In addition, in a case where the weight-average molecular weight of the water-soluble polymer is 5000 or more, it is possible to suppress the rate at which the ink droplets are fixed to some extent, and expand the ink droplets to a desired size. As a result, it is possible to obtain a high-quality ink image with good graininess.

From the viewpoint of suppressing permeation into the recording medium, the weight-average molecular weight of the water-soluble polymer is more preferably 7500 or more and still more preferably 10000 or more. In addition, from the viewpoint of coatability in a case where the pretreatment liquid is applied to the recording medium by a coating method, jettability in a case where the pretreatment liquid is jetted by the inkjet recording method, and solubility in the pretreatment liquid, the weight-average molecular weight of the water-soluble polymer is preferably 40000 or less, and more preferably 30000 or less. The weight-average molecular weight is a value measured by gel permeation chromatography (GPC). The specific measurement conditions are as described above.

The content of the water-soluble polymer is not particularly limited, but is preferably 0.1% by mass to 9% by mass and more preferably 0.5% by mass to 9% by mass with respect to the total amount of the pretreatment liquid. In a case where the content of the water-soluble polymer is 0.1% by mass or more, the size of the ink droplets can be appropriately expanded. In a case where the content of the water-soluble polymer is 9% by mass or less, the viscosity of the pretreatment liquid is appropriately maintained. In addition, in a case where the content of the water-soluble polymer is 9% by mass or less, it is possible to avoid precipitation of the water-soluble polymer due to coagulation or salting out with the salt of acid, which is contained in the pretreatment liquid, phase separation between the water-soluble polymer and other components, and the like. That is, storage stability is good.

The water-soluble polymer may or may not have an ionic group. Examples of a water-soluble polymer having no ionic group include polyvinylpyrrolidone, polyethylene glycol, block copolymers of polyethylene glycol and polypropylene glycol, polyacrylic acid, polyacrylamide, polymethyl vinyl ether, and polyisopropylacrylamide.

In a case of using a water-soluble polymer having an ionic group, as the ionic group, an anionic group is preferable, and examples thereof include a carboxy group, a sulfonic acid group, and a phosphoric acid group.

(Surfactant)

The pretreatment liquid of the present disclosure may contain a surfactant. The surfactant can be used as the surface tension adjuster, and is preferably a nonionic surfactant.

Examples of the nonionic surfactant include polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkylamine, glycerin fatty acid ester, and an oxyethylene oxypropylene block copolymer.

(Antifoaming Agent)

The pretreatment liquid of the present disclosure may contain an antifoaming agent. The type of the antifoaming agent is not particularly limited, and for example, a silicone-based antifoaming agent can be used. Examples of the silicone-based antifoaming agent include product name "BYK-038" manufactured by BYK.

(Additive)

The pretreatment liquid of the present disclosure may contain an additive other than the above-described components. Examples of the additive which can be contained in the pretreatment liquid include the same additives which can be contained in the ink composition.

The surface tension of the pretreatment liquid is not particularly limited, but for example, is preferably 25 mN/m or more, more preferably 25 mN/m to 60 mN/m, and still more preferably 25 mN/m to 45 mN/m. The surface tension of the pretreatment liquid can be adjusted, for example, by the type and content of the surfactant contained in the pretreatment liquid. The surface tension of the pretreatment liquid is measured by a plate method using a surface tensiometer, for example, product name "Fully Automatic Surface Tensiometer CBVP-Z" manufactured by Kyowa Interface Science Co., Ltd. under the condition of 25° C.

From the viewpoint of aggregation rate of the ink composition, the pH (25° C.±1° C.) of the pretreatment liquid is preferably 5.0 or less, more preferably 4.5 or less, and still more preferably 4.0 or less. In addition, from the viewpoint of suppressing the corrosion of the members by the pretreatment liquid, the pH (25° C.±1° C.) of the pretreatment liquid is preferably 2.0 or more, and more preferably 3.0 or more. The pH of the pretreatment liquid is measured under the condition of 25° C. using a pH meter, for example, product name "HM-31" manufactured by DKK-TOA CORPORATION.

From the viewpoint of aggregation rate of the ink composition, the viscosity of the pretreatment liquid is preferably 1 mPa·s to 30 mPa·s, more preferably 1 mPa·s to 20 mPa·s, still more preferably 2 mPa·s to 15 mPa·s, and particularly preferably 2 mPa·s to 10 mPa·s. The viscosity of the pretreatment liquid is measured under the condition of 25° C. using a rotary viscometer, for example, product name "VISCOMETER TV-22" manufactured by TOM SANGYO CO., LTD.

<Ink Set>

The ink set according to the embodiment of the present disclosure includes a pretreatment liquid and an ink composition. As the pretreatment liquid and the ink composition, the above-described pretreatment liquid and ink composition can be used.

A specific configuration of the ink set according to the embodiment of the present disclosure is not particularly limited as long as it contains the ink composition and the pretreatment liquid. Examples of suitable configurations of the ink set according to the embodiment of the present disclosure include a configuration (three color configuration) formed of a combination of cyan ink serving as the ink composition, magenta ink serving as the ink composition, yellow ink serving as the ink composition, and the pretreatment liquid; and a configuration (four color configuration) formed of a combination of black ink serving as the ink composition, cyan ink serving as the ink composition, magenta ink serving as the ink composition, yellow ink serving as the ink composition, and the pretreatment liquid. However, the ink set according to the embodiment of the present disclosure may be an ink set with the one color configuration or the two color configuration formed of one or two kinds of ink compositions and the pretreatment liquid as necessary.

In addition, the ink set according to the embodiment of the present disclosure may contain at least one other ink composition selected from the group consisting of light cyan ink, light magenta ink, and light yellow ink, in addition to the ink compositions described above. In addition, the ink set according to the embodiment of the present disclosure may contain at least one other ink composition selected from the group consisting of orange ink, green ink, and violet ink. As the other ink compositions, known ink compositions can be used. In addition, the ink set according to the embodiment of the present disclosure may include two or more kinds of pretreatment liquids as necessary.

<Image Recording Method>

The image recording method according to the embodiment of the present disclosure includes a pretreatment liquid applying step of applying the above-described pretreatment liquid to a recording medium and an ink applying step of applying the above-described ink composition to the recording medium to which the above-described pretreatment liquid has been applied by an inkjet recording method.

(Pretreatment Liquid Applying Step)

The pretreatment liquid applying step is a step of applying the pretreatment liquid to the recording medium. The pretreatment liquid can be applied using a known method such as a coating method, an immersion method, and an inkjet recording method. The coating method is performed using, for example, a bar coater, an extrusion coater, an air doctor coater, a blade coater, a rod coater, a knife coater, a squeeze coater, or a reverse roll coater. Details of the inkjet recording method will be described later.

The amount of the pretreatment liquid applied is preferably $1.0 \, g/m^2$ to $3.0 \, g/m^2$ and more preferably $1.5 \, g/m^2$ to $2.5 \, g/m^2$.

The pretreatment liquid applying step is provided before the ink applying step using the ink composition. In the image recording method of the present disclosure, it is preferable to further include a step of drying the pretreatment liquid on the recording medium after the pretreatment liquid applying step and before the ink applying step. As a result, the spread of the ink droplets is further suppressed, and an ink image having good graininess can be recorded.

Examples of the drying method include a known heating unit such as a heater, a blowing unit using a blowing air, such as a dryer, and a method using a unit combining these. Specific examples of the drying method include a method of applying heat with a heater or the like from a surface of the recording medium opposite to a surface to which the pretreatment liquid has been applied, and a method of applying warm air or hot air to the surface of the recording medium to which the pretreatment liquid has been applied. The drying time is, for example, 0.1 to 3 seconds.

(Ink Applying Step)

The ink applying step is a step of applying the ink composition to the recording medium to which the pretreatment liquid has been applied by an inkjet recording method.

As the inkjet recording method, a generally known method can be used, and examples thereof include an electric charge control method of jetting the ink composition by using an electrostatic attraction force; a drop-on-demand method (pressure pulse method) of using a vibration pressure of a piezo element; an acoustic ink jet method of converting an electric signal into an acoustic beam, irradiating the ink composition, and jetting the ink composition using a radiation pressure; and a thermal ink jet method of heating the ink composition to form air bubbles and utilizing the generated pressure.

In general, an image recording method by an ink jet recording device includes a shuttle scan method (also referred to as a "serial head method") of recording images using a short serial head, and a single-pass method (also referred to as a "line head method") that image recording is performed using a line head in which recording elements are arranged corresponding to the entire width direction of the recording medium. In the shuttle scan method, images are recorded while scanning the serial head in the width direction of the recording medium. On the other hand, in the single-pass method, images can be recorded on the entire surface of the recording medium by scanning the recording medium in the direction orthogonal to the arrangement direction of the recording elements. Therefore, different from the shuttle scan method, the single-pass method does not require a transport system of scanning the serial head, such as a carriage. In addition, in the single-pass method, movement of the carriage and complicated scanning control with the recording medium are not required, and only the recording medium moves, so that the recording speed can be increased as compared with the shuttle scan method.

It is preferable that the ink applying step is started in 10 seconds after the pretreatment liquid applying step, and it is more preferable that the ink applying step is started in 0.1 seconds to 10 seconds. As a result, the image can be recorded at high speed. In the image recording method according to the embodiment of the present disclosure, even in a case where the image is recorded at high speed, the landing interference is suppressed, and a high-quality ink image can be recorded. The "started in 10 seconds after the pretreatment liquid applying step" means that the time from the completion of the application of the pretreatment liquid until the first ink droplet lands on the recording medium is within 10 seconds. In addition, in a case of including the step of drying the pretreatment liquid on the recording medium, it means that the time from the completion of the drying process until the first ink droplet lands on the recording medium is within 10 seconds. In a case where the pretreatment liquid is applied by the inkjet recording method, it means that the time from when the liquid droplets of the pretreatment liquid land on the recording medium to when the first ink droplet land on the recording medium is within 10 seconds.

From the viewpoint of obtaining an ink image having good graininess, the amount of droplets of the ink composition jetted from the inkjet head is preferably 1.5 picolitre (pL) to 3.0 pL and more preferably 1.5 pL to 2.5 pL. The amount of droplets jetted means a volume of ink jetted from one nozzle at one time by the inkjet recording method.

The amount of the ink composition applied is preferably 2.3 $g/m^2$ to 16.0 $g/m^2$ and more preferably 3.0 $g/m^2$ to 13.0 $g/m^2$.

The resolution of the ink composition in jetting is preferably 200 dot per inch (dpi) or more×200 dpi or more, and more preferably 400 dpi or more×400 dpi or more and 1200 dpi or less×1200 dpi or less. The "dpi" means the number of dots per 25.4 mm.

In the image recording method according to the embodiment of the present disclosure, it is preferable to further include a step of drying the ink composition on the recording medium after the ink applying step. As a result, the spread of the ink droplets is suppressed, and an ink image having good graininess can be recorded.

Examples of the drying method include a known heating unit such as a heater, a blowing unit using a blowing air, such as a dryer, and a method using a unit combining these. Specific examples thereof include a method of applying heat with a heater or the like from a surface of the recording medium opposite to a surface to which the pretreatment liquid has been applied, and a method of applying warm air or hot air to the surface of the recording medium to which the pretreatment liquid has been applied. The drying time is, for example, 0.1 to 7 seconds.

(Recording Medium)

In the image recording method according to the embodiment of the present disclosure, the ink image is recorded on the recording medium.

The type of the recording medium is not particularly limited, and general printing paper mainly composed of cellulose, which is used for general offset printing and the like, can be used.

So-called coated paper is suitable as the recording medium. The coated paper is formed by providing a coating layer containing an inorganic pigment and the like on a surface of high-quality paper, alkaline paper, or the like which is mainly formed of cellulose serving as a support and is not usually surface-treated. As the coated paper, art paper, coated paper, lightweight coated paper, or fine coated paper is preferable.

The inorganic pigment contained in the coating layer is not particularly limited, but at least one selected from the group consisting of silica, kaolin, clay, baked clay, zinc oxide, tin oxide, magnesium sulfate, aluminum oxide, aluminum hydroxide, pseudo-boehmite, calcium carbonate, sachin white, aluminum silicate, smectite, zeolite, magnesium silicate, magnesium carbonate, magnesium oxide, and diatomaceous earth is preferable, and calcium carbonate, silica, or kaolin is more preferable.

As the recording medium, commercially available products can be used, and examples thereof include high-quality paper (A) such as "OK PRINCE HIGH QUALITY" manufactured by Oji Paper Co., Ltd., "SHIORAI" manufactured by Nippon Paper Industries Co., Ltd., and "NEW NPI HIGH QUALITY" manufactured by Nippon Paper Industries Co., Ltd.; fine coated paper such as "OK EVERLIGHT COAT" manufactured by Oji Paper Co., Ltd. and "AURORA S" manufactured by Nippon Paper Industries Co., Ltd.; lightweight coated paper (A3) such as "OK COAT L" manufactured by Oji Paper Co., Ltd. and "AURORA L" manufactured by Nippon Paper Industries Co., Ltd.; coated paper (A2, B2) such as "OK TOP COAT+" manufactured by Oji Paper Co., Ltd. and "AURORA COAT" manufactured by Nippon Paper Industries Co., Ltd.; and art paper (A1) such as "OK KINTO+" manufactured by Oji Paper Co., Ltd., "UF COAT" manufactured by Oji Paper Co., Ltd., and "TOKUBISHI ART" manufactured by Mitsubishi Paper Mills Ltd. In addition, as the recording medium, various photographic papers for inkjet recording can also be used.

Among these, from the viewpoint of obtaining an ink image having good graininess, the recording medium is preferably a recording medium having a water absorption coefficient Ka of 0.05 mL/m$^2$·ms$^{1/2}$ to 0.5 mL/m$^2$·ms$^{1/2}$, more preferably a recording medium having a water absorption coefficient Ka of 0.1 mL/m$^2$·ms$^{1/2}$ to 0.4 mL/m$^2$·ms$^{1/2}$, and still more preferably a recording medium having a water absorption coefficient Ka of 0.2 mL/m$^2$ρms$^{1/2}$ to 0.3 mL/m$^2$·ms$^{1/2}$.

The water absorption coefficient Ka is synonymous with that described in JAPAN TAPPI Pulp and Paper Test Method No. 51:2000 (published by Japan Technical Association of Pulp and Paper). Specifically, the absorption coefficient Ka is calculated from the difference in an amount of water transfer between the contact time of 100 ms and the contact time of 900 ms using product name "Automatic scanning liquid absorptometer KM500Win" manufactured by KUMAGAI RIM KOGYO Co., Ltd.

In the present disclosure, it is preferable that the amount of the pretreatment liquid applied and the amount of the ink composition applied are adjusted according to the type of the recording medium.

EXAMPLES

Hereinafter, the present disclosure will be described in more detail using Examples. However, the present disclosure is not limited to the following examples as long as it does not exceed the gist of the present invention. "Part" is based on mass.

The liberated rate of the pigment dispersant was calculated by performing centrifugation treatment using a centrifuge, for example, product name "himac CS150FNX" manufactured by Koki Holdings Co., Ltd. and using S140AT as a rotor under conditions of a weight acceleration of 343,000×g for 30 minutes. Specifically, first, the pigment dispersion liquid was centrifuged under the above-described conditions to remove the precipitate. Thereafter, the supernatant solution was recovered, and the amount of the pigment dispersant included in the recovered supernatant solution was measured. The ratio of the amount of the pigment dispersant included in the recovered supernatant solution to the amount of the charged pigment dispersant was defined as the liberated rate.

The weight-average molecular weight was measured by gel permeation chromatography (GPC). Specifically, product name "HLC-8020GPC" manufactured by Tosoh Corporation was used as GPC, three columns of product name "TSKgel, SuperMultipore HZ-H" (4.6 mmID×15 cm) manufactured by Tosoh Corporation were used as a column, and tetrahydrofuran (THF) was used as an eluent. The measurement was performed under conditions of a sample concentration of 0.45% by mass, a flow rate of 0.35 ml/min, a sample injection amount of 10 and a measurement temperature of 40° C. using an IR detector. A calibration curve was obtained from, as a standard sample, eight samples of product names "TSK Standard polystyrene" manufactured by Tosoh Corporation: "F-40", "F-20", "F-4", "F-1", "A-5000", "A-2500", "A-1000", and "n-propylbenzene".

Example 1

[Preparation of Pretreatment Liquid]

Each component was mixed to have the following content. The pH of the pretreatment liquid was 4.

| | |
|---|---|
| Malonic acid | 10.9% by mass |
| Citric acid | 13.4% by mass |
| Polyethylene glycol (product name "Polyethylene glycol 6000", manufactured by FUJIFILM Wako Pure Chemical Corporation, weight-average molecular weight: 7300 to 9300) | 1% by mass |
| Diethylene glycol monobutyl ether | 1% by mass |
| Potassium hydroxide | 7.3% by mass |
| Antifoaming agent (product name "BYK-038", manufactured by BYK) | 0.01% by mass |
| Ion exchange water | residual amount (% by mass) such that the total amount of the pretreatment liquid was 100% by mass |

[Preparation of Ink Composition]

5 parts of Pigment Blue 15:3 (product name "phthalocyanine blue A220", manufactured by Dainichiseika Color & Chemicals Mfg. Co., Ltd.) which is a cyan pigment, 1.5 parts of a pigment dispersant, 42 parts of methyl ethyl ketone, 5.5 parts of a 1 mol/liter sodium hydroxide aqueous solution, and 87.2 parts of ion exchange water were mixed, and dispersed for 3 hours using zirconia beads having a diameter of 0.1 mm by a beads mill. As the pigment dispersant, a water-soluble random polymer, in which a mass ratio of a structural unit derived from methacrylic acid and a structural unit derived from benzyl methacrylate was 20:80, an acid value was 130 mgKOH/g, and a weight-average molecular weight was 25000, was used.

The methyl ethyl ketone was removed from the obtained dispersion at 55° C. under reduced pressure, and a part of the water was further removed. Next, a centrifugation treatment was performed at 8000 revolutions per minute (rpm) for 30 minutes using a high-speed centrifugal cooling machine 7550 (manufactured by KUBOTA CORPORATION) and a 50 mL centrifuge pipe, and the supernatant solution other than the precipitate was recovered. Thereafter, the pigment concentration was obtained from the absorbance spectrum to obtain a cyan pigment dispersion liquid A1 having a pigment concentration of 20% by mass. The average particle diameter of the obtained cyan pigment dispersion liquid A1 was 85 nm. In addition, the liberated rate of the pigment dispersant in the cyan pigment dispersion liquid A1 was 50%. Since the mass ratio of the pigment dispersant to the cyan pigment was 30% by mass, the mass ratio of the liberated pigment dispersant to the cyan pigment was 15% by mass.

Next, each component was mixed to have the following content. The mixture was packed in a plastic disposable syringe and filtered through a polyvinylidene fluoride (PVDF) filter (product name "Millex-SV", diameter: 25 mm, manufactured by Millipore) having a pore diameter of 5 μm, thereby preparing an ink composition having a pigment concentration of 20% by mass.

| | |
|---|---|
| Cyan pigment dispersion liquid A1 (pigment concentration: 20% by mass) | 2.5% by mass (pigment content) |
| Water-soluble polymer having carboxy group (concentration of solid contents: 27% by mass) | 1.5% by mass (solid content) |
| Propylene glycol | 30% by mass |
| Glycerin | 2.5% by mass |
| Urea | 5% by mass |
| Ester wax (product name "Selosol 524", manufactured by CHUKYO YUSHI CO., LTD., concentration of solid contents: 30% by mass) | 2.0% by mass (solid content) |
| Water | residual amount (% by mass) such that the total amount of the ink composition was 100% by mass |

As the water-soluble polymer having a carboxy group, a random polymer, in which a mass ratio of a structural unit derived from acrylic acid, a structural unit derived from styrene, and a structural unit derived from α-methylstyrene was 29.5:35.2:35.3, an acid value was 230 mgKOH/g, and a weight-average molecular weight was 14000, was used.

As described above, since the mass ratio of the liberated pigment dispersant to the cyan pigment was 15% by mass, and the content of the cyan pigment was 2.5% by mass with respect to the total amount of the ink composition, the content of the liberated pigment dispersant was 0.375% by mass from 2.5×0.15=0.375.

[Image Recording]

An ink image was recorded using the prepared pretreatment liquid and ink composition. The ink applying step was started within 10 seconds after the pretreatment liquid applying step.

(Pretreatment Liquid Applying Step)

Using a bar coater, the pretreatment liquid was applied to a surface of a recording medium so that the coating amount was 1.7 g/m².

Next, the pretreatment liquid applied to the recording medium was dried under the following conditions.

Drying method: side of the recording medium to which the pretreatment liquid was applied was dried by warm air at 120° C.

Blower region: 200 mm×200 mm

Wind speed: 15 m/s

Drying time: 0.7 seconds (Ink Applying Step)

A printer head (product name "GELJET (registered trademark) GX5000") manufactured by Ricoh Co., Ltd. was prepared, the ink composition was loaded into a storage tank connected to the printer head, and an ink image was recorded in a single pass.

Next, the ink composition applied to the recording medium was dried under the following conditions.

Drying method: hot plate at 70° C. was brought into contact with a rear surface (side to which the ink composition was not applied) of the recording medium, and warm air at 120° C. was applied to the side of the recording medium to which the ink composition was applied to dry the recording medium.

Blower region: 200 mm×200 mm

Wind speed: 15 m/s

Drying time: 5 seconds

Example 2

A pretreatment liquid and an ink composition were prepared in the same manner as in Example 1, except that, in the pretreatment liquid prepared in Example 1, the content of potassium hydroxide was changed such that the pH was 2. In addition, image recording was performed in the same manner as in Example 1.

Example 3

A pretreatment liquid and an ink composition were prepared in the same manner as in Example 1, except that, in the pretreatment liquid prepared in Example 1, the content of potassium hydroxide was changed such that the pH was 6. In addition, image recording was performed in the same manner as in Example 1.

Example 4

A pretreatment liquid and an ink composition were prepared in the same manner as in Example 1, except that, in the ink composition prepared in Example 1, the content of the water-soluble polymer having a carboxy group was changed from 1.5% by mass to 2% by mass. In addition, image recording was performed in the same manner as in Example 1.

Example 5

A pretreatment liquid and an ink composition were prepared in the same manner as in Example 1, except that, in the ink composition prepared in Example 1, the content of the water-soluble polymer having a carboxy group was changed from 1.5% by mass to 2.5% by mass. In addition, image recording was performed in the same manner as in Example 1.

Example 6

A pretreatment liquid and an ink composition were prepared in the same manner as in Example 1, except that, in the ink composition prepared in Example 1, the content of the water-soluble polymer having a carboxy group was changed from 1.5% by mass to 3% by mass. In addition, image recording was performed in the same manner as in Example 1.

Example 7

A pretreatment liquid and an ink composition were prepared in the same manner as in Example 1, except that, in the ink composition prepared in Example 1, the content of the water-soluble polymer having a carboxy group was changed from 1.5% by mass to 1% by mass. In addition, image recording was performed in the same manner as in Example 1.

Example 8

A pretreatment liquid and an ink composition were prepared in the same manner as in Example 1, except that, in the ink composition prepared in Example 1, the water-soluble polymer having a carboxy group was changed to a random polymer, in which a mass ratio of a structural unit derived from acrylic acid, a structural unit derived from styrene, and a structural unit derived from α-methylstyrene was 32.5:33.7:33.8, an acid value was 253 mgKOH/g, and a weight-average molecular weight was 16500. In addition, image recording was performed in the same manner as in Example 1.

Example 9

A pretreatment liquid and an ink composition were prepared in the same manner as in Example 1, except that, in the ink composition prepared in Example 1, the water-soluble polymer having a carboxy group was changed to a random polymer, in which a mass ratio of a structural unit derived from acrylic acid, a structural unit derived from styrene, and a structural unit derived from α-methylstyrene was 28.8:35.6:35.6, an acid value was 224 mgKOH/g, and a weight-average molecular weight was 8500. In addition, image recording was performed in the same manner as in Example 1.

Example 10

A pretreatment liquid and an ink composition were prepared in the same manner as in Example 1, except that, in the ink composition prepared in Example 1, the water-soluble polymer having a carboxy group was changed to a random polymer, in which a mass ratio of a structural unit derived from acrylic acid, a structural unit derived from styrene, and a structural unit derived from α-methylstyrene was 35.9:32.1:32.0, an acid value was 279 mgKOH/g, and a weight-average molecular weight was 1700. In addition, image recording was performed in the same manner as in Example 1.

Example 11

A pretreatment liquid and an ink composition were prepared in the same manner as in Example 1, except that, in the ink composition prepared in Example 1, the water-soluble polymer having a carboxy group was changed to a random polymer, in which a mass ratio of a structural unit derived from acrylic acid, a structural unit derived from styrene, and a structural unit derived from α-methylstyrene was 35.7:32.1:32.2, an acid value was 278 mgKOH/g, and a weight-average molecular weight was 16500. In addition, image recording was performed in the same manner as in Example 1.

Example 12

A pretreatment liquid and an ink composition were prepared in the same manner as in Example 1, except that, in the ink composition prepared in Example 1, the water-soluble polymer having a carboxy group was changed to a random polymer, in which a mass ratio of a structural unit derived from methacrylic acid, a structural unit derived from methyl methacrylate, and a structural unit derived from 2-ethylhexyl acrylate was 13.0:62.0:25.0, an acid value was 85 mgKOH/g, and a weight-average molecular weight was 10000, and the content thereof was changed from 1.5% by mass to 2.5% by mass. In addition, image recording was performed in the same manner as in Example 1.

Example 13

A pretreatment liquid and an ink composition were prepared in the same manner as in Example 1, except that, to the ink composition prepared in Example 1, the following resin particles were further added. In addition, image recording was performed in the same manner as in Example 1.

| | |
|---|---|
| Resin particles (polymer particles in which a mass ratio of a structural unit derived from methacrylic acid, a structural unit derived from methyl methacrylate, and a structural unit derived from isobornyl methacrylate was 10:20:70, acid value: 65 mgKOH/g, weight-average molecular weight: 60000, average particle diameter: 10 nm) | 2% by mass |

Example 14

A pretreatment liquid and an ink composition were prepared in the same manner as in Example 1, except that, in the ink composition prepared in Example 13, the content of the resin particles was changed from 2% by mass to 2.5% by mass. In addition, image recording was performed in the same manner as in Example 1.

Example 15

A pretreatment liquid and an ink composition were prepared in the same manner as in Example 1, except that, in the ink composition prepared in Example 1, the water-soluble polymer having a carboxy group was changed to a random polymer, in which a mass ratio of a structural unit derived from methacrylic acid and a structural unit derived from benzyl methacrylate was 20:80, an acid value was 130 mgKOH/g, and a weight-average molecular weight was 25000. In addition, image recording was performed in the same manner as in Example 1.

Example 16

A pretreatment liquid and an ink composition were prepared in the same manner as in Example 1, except that, in the ink composition prepared in Example 1, the cyan pigment dispersion liquid A1 was changed to a cyan pigment dispersion liquid A2. In addition, image recording was performed in the same manner as in Example 1. The cyan pigment dispersion liquid A2 was prepared in the same manner as in Example 1 by mixing the cyan pigment and a pigment dispersant such that the mass ratio of the pigment dispersant to the cyan pigment was 40% by mass. As the pigment dispersant, a water-soluble random polymer, in which a mass ratio of a structural unit derived from methacrylic acid, a structural unit derived from stearyl methacrylate, a structural unit derived from hydroxyethyl methacrylate, and a structural unit derived from benzyl methacrylate was 14:20:27:39, an acid value was 91 mgKOH/g, and a weight-average molecular weight was 22000, was used. The average particle diameter of the obtained cyan pigment dispersion liquid A2 was 88 nm. In addition, the liberated rate of the pigment dispersant in the cyan pigment dispersion liquid A2 was 50%. Since the mass ratio of the pigment dispersant to the cyan pigment was 40% by mass, the mass ratio of the liberated pigment dispersant to the cyan pigment was 20% by mass. In addition, since the content of the cyan pigment was 2.5% by mass with respect to the total amount of the ink composition, the content of the liberated pigment dispersant was 0.5% by mass from 2.5×0.2=0.5.

Example 17

A pretreatment liquid and an ink composition were prepared in the same manner as in Example 1, except that, to the ink composition prepared in Example 1, the following water-soluble polymer having no carboxy group was further added. In addition, image recording was performed in the same manner as in Example 1.

| | |
|---|---|
| Polyethylene glycol (product name "PEG 100000", manufactured by FUJIFILM Wako Pure Chemical Corporation, weight-average molecular weight: 100000) | 0.1% by mass |

Example 18

An ink composition was prepared in the same manner as in Example 1, except that the pretreatment liquid prepared in Example 1 was changed to the following pretreatment liquid. In addition, image recording was performed in the same manner as in Example 1.
[Preparation of Pretreatment Liquid]
As the pretreatment liquid, a 1 mol/liter hydrochloric acid (manufactured by FUJIFILM Wako Pure Chemical Corporation) was used.

Example 19

An ink composition was prepared in the same manner as in Example 1, except that the wax was not contained in the ink composition prepared in Example 1. In addition, image recording was performed in the same manner as in Example 1.

Example 20

An ink composition was prepared in the same manner as in Example 1, except that the pretreatment liquid prepared in Example 1 was changed to the following pretreatment liquid. In addition, image recording was performed in the same manner as in Example 1.
[Preparation of Pretreatment Liquid]
Each component was mixed to have the following content. The pH of the pretreatment liquid was 3.

| | |
|---|---|
| Calcium nitrate | 10% by mass |
| Diethylene glycol monomethyl ether | 5% by mass |
| Ion exchange water | residual amount (% by mass) such that the total amount of the pretreatment liquid was 100% by mass |

Example 21

An ink composition was prepared in the same manner as in Example 1, except that the pretreatment liquid prepared in Example 1 was changed to the following pretreatment liquid. In addition, image recording was performed in the same manner as in Example 1.
[Preparation of Pretreatment Liquid]
Each component was mixed to have the following content. The pH of the pretreatment liquid was 3.

| | |
|---|---|
| Cationic polymer: polydiallyl dimethylammonium chloride | 10% by mass |
| Diethylene glycol monomethyl ether | 5% by mass |
| Ion exchange water | residual amount (% by mass) such that the total amount of the pretreatment liquid was 100% by mass |

Comparative Example 1

A pretreatment liquid and an ink composition were prepared in the same manner as in Example 1, except that, in the ink composition prepared in Example 1, the content of the water-soluble polymer having a carboxy group was changed from 1.5% by mass to 0.75% by mass. In addition, image recording was performed in the same manner as in Example 1.

Comparative Example 2

A pretreatment liquid and an ink composition were prepared in the same manner as in Example 1, except that, in the ink composition prepared in Example 1, the water-soluble polymer having a carboxy group was not contained. In addition, image recording was performed in the same manner as in Example 1.

Comparative Example 3

An ink composition was prepared in the same manner as in Example 1, except that the pretreatment liquid prepared in Example 1 was changed to the following pretreatment liquid, and the content of the water-soluble polymer having a carboxy group was changed from 1.5% by mass to 1% by mass. In addition, image recording was performed in the same manner as in Example 1.
[Preparation of Pretreatment Liquid]
Each component was mixed to have the following content. The pH of the pretreatment liquid was 8.0.

| | |
|---|---|
| Polyethylene glycol (product name "Polyethylene glycol 6000", manufactured by FUJIFILM Wako Pure Chemical Corporation, weight-average molecular weight: 7300 to 9300) | 1% by mass |
| Diethylene glycol monobutyl ether | 1% by mass |
| Potassium hydroxide | 7.3% by mass |
| Antifoaming agent (product name "BYK-038", manufactured by BYK) | 0.01% by mass |
| Ion exchange water | residual amount (% by mass) such that the total amount of the pretreatment liquid was 100% by mass |

Comparative Example 4

A pretreatment liquid and an ink composition were prepared in the same manner as in Example 1, except that, in the ink composition prepared in Example 1, the water-soluble polymer having a carboxy group was changed to a random polymer, in which a mass ratio of a structural unit derived from methacrylic acid, a structural unit derived from methyl methacrylate, and a structural unit derived from 2-ethylhexyl acrylate was 13.0:62.0:25.0, an acid value was 85 mgKOH/g, and a weight-average molecular weight was 10000, and the content thereof was changed from 1.5% by mass to 1% by mass. In addition, image recording was performed in the same manner as in Example 1.

Comparative Example 5

A pretreatment liquid and an ink composition were prepared in the same manner as in Example 1, except that, in the ink composition prepared in Example 1, the water-soluble polymer having a carboxy group was changed to a random polymer, in which a mass ratio of a structural unit derived from acrylic acid, a structural unit derived from methacrylic acid, a structural unit derived from methyl methacrylate, a structural unit derived from ethyl acrylate, and a structural unit derived from ethyl methacrylate was 4.6:4.6:28.4:31.2:31.2, an acid value was 66 mgKOH/g, and a weight-average molecular weight was 60000, and the content thereof was changed from 1.5% by mass to 1% by mass. In addition, image recording was performed in the same manner as in Example 1.

Comparative Example 6

A pretreatment liquid and an ink composition were prepared in the same manner as in Example 1, except that, in the ink composition prepared in Example 1, the content of the water-soluble polymer having a carboxy group was changed from 1.5% by mass to 3.5% by mass. In addition, image recording was performed in the same manner as in Example 1.

Comparative Example 7

A pretreatment liquid and an ink composition were prepared in the same manner as in Example 1, except that, in the ink composition prepared in Example 1, the content of the water-soluble polymer having a carboxy group was changed from 1.5% by mass to 0.5% by mass. In addition, image recording was performed in the same manner as in Example 1.

Table 1 shows components contained in the pretreatment liquids and ink compositions prepared Examples and Comparative Examples, and contents and physical property values thereof. Specifically, with regard to the pretreatment liquid, the pH and the type of the aggregating agent are shown. With regard to the ink composition, contents, acid values, weight-average molecular weights, and SP values of the liberated pigment dispersant, and content, acid values, weight-average molecular weights, and SP values of the water-soluble polymer having a carboxy group, which was mixed with the pigment dispersion liquid, are shown. In addition, types and contents of organic solvents and components other than water are shown. In addition, the product of the acid value a1 and the content b1 of the liberated pigment dispersant and the product of the acid value a2 and the content b2 of the water-soluble polymer having a carboxy group, which was mixed with the pigment dispersion liquid, are calculated and shown. $\Sigma(a \times b)$ is calculated from $a1 \times b1 + a2 \times b2$ and shown.

In the present examples, as described above, the pigment dispersion liquid was centrifuged to calculate $\Sigma(a \times b)$, but the same value is obtained even in a case where the ink composition was centrifuged to calculate $\Sigma(a \times b)$.

Next, using the pretreatment liquids and ink compositions prepared in Examples and Comparative Examples, graininess of the ink image and jetting stability of the ink composition were evaluated. The evaluation methods are as follows. The evaluation results are shown in Table 1.

<Graininess>

As a recording medium, product name "OK TOP COAT+" (manufactured by Oji Paper Co., Ltd.) was used. As conditions of the image recording, an amount of droplets jetted was 2 pL, a jetting frequency was 25.5 kHz, and a resolution was 1200 dpi×1200 dpi. In the above-described ink applying step, one ink image having a recording duty of 80% was recorded. The recording duty of 100% is defined as an image recorded under the condition that one drop of approximately 2.0 pL of ink is applied to a unit region (1 pixel) of 1/1200 inch×1/1200 inch with a resolution of 1200 dpi×1200 dpi. The obtained recorded product was visually observed and the graininess was evaluated. Specifically, the recorded product was observed from a position 50 cm away from the recorded product, and the degree of roughness of the ink image was determined. The number of people to evaluate was 10, and the evaluation score was rounded off to the nearest decimal point of the average score of 10 people. The evaluation standard was as follows. Evaluation scores 3 to 5 are levels which do not cause any problems in practical use.

5: roughness could not be recognized.
4: roughness could be slightly recognized, but was not worried.
3: roughness was observed but acceptable.
2: roughness was worried.
1: roughness was considerably worried.

<Jetting Stability>

As a recording medium, product name "Inkjet paper photo finishing Pro" (manufactured by FUJIFILM Corporation) was used. As conditions of the image recording, a transportation speed of the recording medium was 248 mm/min, an amount of droplets jetted was 3.4 pL, a jetting frequency was 10 kHz, and a resolution was 75 dpi×1200 dpi in a nozzle arrangement direction×transport direction. An image sample was produced by jetting 2000 ink droplets per one nozzle in parallel with the transport direction of 96 lines. The obtained image sample was visually observed to confirm that ink droplets were jetted from all the nozzles. Thereafter, the print head was left as it was for 3 hours in an environment of 25° C. and 80% relative humidity. Using a new recording medium, image recording was performed again under the same conditions to produce an image sample. The obtained image sample was visually observed, and the jetting stability was evaluated based on the number of jetting failure nozzles after jetting 2000 ink droplets. The evaluation standard was as follows. In a case where the number of jetting failure nozzles was 11 or less, the level has no problem in practical use.

5: number of jetting failure nozzles was 0 to 3.
4: number of jetting failure nozzles was 4 to 7.
3: number of jetting failure nozzles was 8 to 11.
2: number of jetting failure nozzles was 12 to 20.
1: number of jetting failure nozzles was 21 or more.

TABLE 1

| | Pretreatment liquid | | Ink composition | | | | | | | | | |
|---|---|---|---|---|---|---|---|---|---|---|---|---|
| | | | Pigment dispersant free from pigment | | | | | Mixed water-soluble polymer having carboxy group | | | | |
| | | | Content | | | | Weight- | Content | | | | Weight- |
| | pH | Type of aggregating agent | Acid value a1 (mgKOH/g) | b1 (% by mass) | a1 × b1 | SP value (MPa)$^{1/2}$ | average molecular weight | Acid value a2 (mgKOH/g) | b2 (% by mass) | a2 × b2 | SP value (MPa)$^{1/2}$ | average molecular weight |
| Example 1 | 4 | Malonic acid Citric acid | 130 | 0.375 | 49 | 22.3 | 25000 | 230 | 1.5 | 344 | 22.9 | 14000 |
| Example 2 | 2 | Malonic acid Citric acid | 130 | 0.375 | 49 | 22.3 | 25000 | 230 | 1.5 | 344 | 22.9 | 14000 |
| Example 3 | 6 | Malonic acid Citric acid | 130 | 0.375 | 49 | 22.3 | 25000 | 230 | 1.5 | 344 | 22.9 | 14000 |
| Example 4 | 4 | Malonic acid Citric acid | 130 | 0.375 | 49 | 22.3 | 25000 | 230 | 2 | 459 | 22.9 | 14000 |
| Example 5 | 4 | Malonic acid Citric acid | 130 | 0.375 | 49 | 22.3 | 25000 | 230 | 2.5 | 574 | 22.9 | 14000 |
| Example 6 | 4 | Malonic acid Citric acid | 130 | 0.375 | 49 | 22.3 | 25000 | 230 | 3 | 689 | 22.9 | 14000 |
| Example 7 | 4 | Malonic acid Citric acid | 130 | 0.375 | 49 | 22.3 | 25000 | 230 | 1 | 230 | 22.9 | 14000 |
| Example 8 | 4 | Malonic acid Citric acid | 130 | 0.375 | 49 | 22.3 | 25000 | 253 | 1.5 | 380 | 23.3 | 16500 |
| Example 9 | 4 | Malonic acid Citric acid | 130 | 0.375 | 49 | 22.3 | 25000 | 224 | 1.5 | 336 | 22.8 | 8500 |
| Example 10 | 4 | Malonic acid Citric acid | 130 | 0.375 | 49 | 22.3 | 25000 | 279 | 1.5 | 419 | 23.8 | 1700 |
| Example 11 | 4 | Malonic acid Citric acid | 130 | 0.375 | 49 | 22.3 | 25000 | 278 | 1.5 | 417 | 23.7 | 16500 |
| Example 12 | 4 | Malonic acid Citric acid | 130 | 0.375 | 49 | 22.3 | 25000 | 85 | 2.5 | 212 | 16.0 | 10000 |
| Example 13 | 4 | Malonic acid Citric acid | 130 | 0.375 | 49 | 22.3 | 25000 | 230 | 1.5 | 344 | 22.9 | 14000 |
| Example 14 | 4 | Malonic acid Citric acid | 130 | 0.375 | 49 | 22.3 | 25000 | 230 | 1.5 | 344 | 22.9 | 14000 |
| Example 15 | 4 | Malonic acid Citric acid | 130 | 0.375 | 49 | 22.3 | 25000 | 130 | 1.5 | 195 | 22.3 | 25000 |
| Example 16 | 4 | Malonic acid Citric acid | 91 | 0.5 | 45.5 | 21.3 | 22000 | 230 | 1.5 | 344 | 22.9 | 14000 |
| Example 17 | 4 | Malonic acid Citric acid | 130 | 0.375 | 49 | 22.3 | 25000 | 230 | 1.5 | 344 | 22.9 | 14000 |
| Example 18 | 1 | Hydrochloric acid | 130 | 0.375 | 49 | 22.3 | 25000 | 230 | 1.5 | 344 | 22.9 | 14000 |
| Example 19 | 4 | Malonic acid Citric acid | 130 | 0.375 | 49 | 22.3 | 25000 | 230 | 1.5 | 344 | 22.9 | 14000 |
| Example 20 | 3 | Calcium nitrate | 130 | 0.375 | 49 | 22.3 | 25000 | 230 | 1.5 | 344 | 22.9 | 14000 |
| Example 21 | 3 | Cationic polymer | 130 | 0.375 | 49 | 22.3 | 25000 | 230 | 1.5 | 344 | 22.9 | 14000 |
| Comparative example 1 | 4 | Malonic acid Citric acid | 130 | 0.375 | 49 | 22.3 | 25000 | 230 | 0.75 | 172 | 22.9 | 14000 |
| Comparative example 2 | 4 | Malonic acid Citric acid | 130 | 0.375 | 49 | 22.3 | 25000 | — | — | — | — | — |
| Comparative example 3 | 8 | — | 130 | 0.375 | 49 | 22.3 | 25000 | 230 | 1 | 230 | 22.9 | 14000 |
| Comparative example 4 | 4 | Malonic acid Citric acid | 130 | 0.375 | 49 | 22.3 | 25000 | 85 | 1 | 85 | 16.0 | 10000 |
| Comparative example 5 | 4 | Malonic acid Citric acid | 130 | 0.375 | 49 | 22.3 | 25000 | 66 | 1 | 66 | 20.3 | 60000 |
| Comparative example 6 | 4 | Malonic acid Citric acid | 130 | 0.375 | 49 | 22.3 | 25000 | 230 | 3.5 | 804 | 22.9 | 14000 |
| Comparative example 7 | 4 | Malonic acid Citric acid | 130 | 0.375 | 49 | 22.3 | 25000 | 230 | 0.5 | 115 | 22.9 | 14000 |

| | Ink composition | | | | Evaluation | |
|---|---|---|---|---|---|---|
| | Other components | | | | | |
| | Σ (a × b) | Type | Content (% by mass) | Type | Content (% by mass) | Graininess | Jetting stability |
| Example 1 | 393 | Wax | 2 | — | — | 4 | 4 |
| Example 2 | 393 | Wax | 2 | — | — | 5 | 4 |
| Example 3 | 393 | Wax | 2 | — | — | 3 | 4 |
| Example 4 | 508 | Wax | 2 | — | — | 5 | 3 |
| Example 5 | 623 | Wax | 2 | — | — | 4 | 3 |
| Example 6 | 737 | Wax | 2 | — | — | 3 | 3 |

TABLE 1-continued

| | | | | | | | |
|---|---|---|---|---|---|---|---|
| Example 7 | 278 | Wax | 2 | — | — | 3 | 4 |
| Example 8 | 428 | Wax | 2 | — | — | 4 | 4 |
| Example 9 | 385 | Wax | 2 | — | — | 4 | 4 |
| Example 10 | 468 | Wax | 2 | — | — | 4 | 3 |
| Example 11 | 465 | Wax | 2 | — | — | 4 | 3 |
| Example 12 | 260 | Wax | 2 | — | — | 3 | 5 |
| Example 13 | 393 | Wax | 2 | Resin particles | 2 | 4 | 4 |
| Example 14 | 393 | Wax | 2 | Resin particles | 2.5 | 4 | 3 |
| Example 15 | 244 | Wax | 2 | — | — | 4 | 3 |
| Example 16 | 390 | Wax | 2 | — | — | 4 | 4 |
| Example 17 | 393 | Wax | 2 | PEG100000 | 0.1 | 4 | 3 |
| Example 18 | 393 | Wax | 2 | — | — | 3 | 4 |
| Example 19 | 393 | — | — | — | — | 4 | 4 |
| Example 20 | 393 | Wax | 2 | — | — | 3 | 4 |
| Example 21 | 393 | Wax | 2 | — | — | 3 | 4 |
| Comparative example 1 | 221 | Wax | 2 | — | — | 2 | 4 |
| Comparative example 2 | 49 | Wax | 2 | — | — | 1 | 5 |
| Comparative example 3 | 278 | Wax | 2 | — | — | 1 | 4 |
| Comparative example 4 | 133 | Wax | 2 | — | — | 2 | 5 |
| Comparative example 5 | 115 | Wax | 2 | — | — | 1 | 5 |
| Comparative example 6 | 852 | Wax | 2 | — | — | 2 | 3 |
| Comparative example 7 | 164 | Wax | 2 | — | — | 2 | 4 |

As shown in Table 1, in Examples 1 to 21, the ink composition contained water, a pigment, and a water-soluble polymer having a carboxy group, which is free from the pigment, and the water-soluble polymer satisfied the expression (1), so that an ink image having excellent jetting stability and good graininess was obtained. In particular, in Examples 1 to 4, 7 to 9, and 16, the SP value of the water-soluble free polymer having a carboxy group was 21 $MPa^{1/2}$ to 23.5 $MPa^{1/2}$, so that the jetting stability was more excellent.

On the other hand, in Comparative Example 1, Comparative Example 2, Comparative Example 4, Comparative Example 5, and Comparative Example 7, since the values of $\Sigma(a\times b)$ were as small as 221 mgKOH/g, 49 mgKOH/g, 133 mgKOH/g, 115 mgKOH/g, and 164 mgKOH/g, respectively, it was found that the graininess deteriorated. In addition, in Comparative Example 6, since the value of $\Sigma(a\times b)$ was as large as 852 mgKOH/g, it was found that the graininess deteriorated. In addition, in Comparative Example 3, since the pretreatment liquid did not include at least one aggregating agent selected from the group consisting of acids, cationic polymers, and polyvalent metal salts, it was found that the graininess deteriorated.

Based on the above, since the ink composition according to the embodiment of the present disclosure contains water, a pigment, and a water-soluble polymer having a carboxy group, which is free from the pigment, and the water-soluble polymer satisfies the expression (1), the ink composition according to the embodiment of the present disclosure is used for recording an ink image to a recording medium to which a pretreatment liquid including at least one aggregating agent selected from the group consisting of acids, cationic polymers, and polyvalent metal salts has been applied, so that an ink image having good graininess can be obtained.

The disclosure of Japanese Patent Application No. 2019-085858 filed on Apr. 26, 2019 is incorporated in the present specification by reference. In addition, all documents, patent applications, and technical standards described in the present specification are incorporated herein by reference to the same extent as in a case of being specifically and individually noted that individual documents, patent applications, and technical standards are incorporated by reference.

What is claimed is:

1. An ink composition for inkjet recording comprising:
water;
a pigment; and
two or more kinds of water-soluble polymers, each of which has a carboxy group,
wherein each of the water-soluble polymers satisfies the following expression (1),
the two or more kinds of water-soluble polymers comprise two or more kinds of free polymers which are free from the pigment, a first kind of free polymer among the two or more kinds of free polymers accounts for more than 50% by mass of a total mass of the two or more kinds of the free polymers, the first kind of free polymer is a copolymer which comprises a structural unit derived from an aromatic group-containing monomer as a hydrophobic monomer and a structural unit derived from a carboxy group-containing monomer, and the first kind of free polymer has an acid value of 150 mgKOH/g to 400 mgKOH/g, and
the ink composition for inkjet recording is used for recording an ink image on a recording medium to which a pretreatment liquid comprising at least one aggregating agent selected from the group consisting of acids, cationic polymers, and polyvalent metal salts is applied, $$230 \text{ mgKOH/g} \le \Sigma(a \times b) \le 750 \text{ mgKOH/g} \tag{1}$$

wherein a represents an acid value of the water-soluble polymer, in terms of mgKOH/g, and
b represents a content of the water-soluble polymer with respect to a total amount of the ink composition, in terms of % by mass.

2. The ink composition for inkjet recording according to claim 1,
wherein the acid value of each of the two or more kinds of water-soluble polymers is 90 mgKOH/g or more.

3. The ink composition for inkjet recording according to claim 1,
wherein a weight-average molecular weight of each of the two or more kinds of water-soluble polymers is 25000 or less.

4. The ink composition for inkjet recording according to claim 1,
wherein a solubility parameter of each of the two or more kinds of water-soluble polymers which is calculated by Okitsu method is 21 MPa1/2 to 23.5 MPa1/2.

5. The ink composition for inkjet recording according to claim 1,
wherein water-insoluble resin particles are not contained, or
a content of the water-insoluble resin particles is 2.0% by mass or less with respect to the total amount of the ink composition.

6. The ink composition for inkjet recording according to claim 1,
wherein each of the two or more kinds of water-soluble polymers is a copolymer which comprises a structural unit derived from a hydrophobic monomer and a structural unit derived from a carboxy group-containing monomer.

7. An ink set comprising:
a pretreatment liquid comprising at least one aggregating agent selected from the group consisting of an acid, a cationic polymer, and a polyvalent metal salt; and
the ink composition for inkjet recording according to claim 1.

8. The ink set according to claim 7,
wherein a pH of the pretreatment liquid is 5.0 or less.

9. The ink set according to claim 7,
wherein the at least one aggregating agent is a carboxylic acid.

10. An image recording method comprising:
applying, to a recording medium, a pretreatment liquid comprising at least one aggregating agent selected from the group consisting of an acid, a cationic polymer, and a polyvalent metal salt; and
applying the ink composition for inkjet recording according to claim 1 to the recording medium to which the pretreatment liquid has been applied by an inkjet recording method.

* * * * *